(12) United States Patent
Nojima et al.

(10) Patent No.: US 8,310,391 B2
(45) Date of Patent: Nov. 13, 2012

(54) ELECTRONIC DEVICE, REMOTE CONTROL SYSTEM, SIGNAL PROCESSING METHOD, CONTROL PROGRAM AND RECORDING MEDIUM

(75) Inventors: Mitsunori Nojima, Osaka (JP); Yohei Iwami, Osaka (JP); Minehiro Konya, Osaka (JP); Azusa Umemoto, Osaka (JP); Katsuo Doi, Osaka (JP); Masafumi Takahashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 194 days.

(21) Appl. No.: 12/865,539

(22) PCT Filed: Jan. 28, 2009

(86) PCT No.: PCT/JP2009/051331
§ 371 (c)(1),
(2), (4) Date: Jul. 30, 2010

(87) PCT Pub. No.: WO2009/096415
PCT Pub. Date: Aug. 6, 2009

(65) Prior Publication Data
US 2010/0328133 A1    Dec. 30, 2010

(30) Foreign Application Priority Data

Jan. 31, 2008 (JP) ................................ 2008-022041

(51) Int. Cl.
*G08C 17/00* (2006.01)
(52) U.S. Cl. ..................................................... 341/176
(58) Field of Classification Search .................. 341/176; 348/734; 340/825.69, 825.72
See application file for complete search history.

(56) References Cited

U.S. PATENT DOCUMENTS
4,751,581 A    6/1988 Ishiguro et al.
(Continued)

FOREIGN PATENT DOCUMENTS
JP    62-115992 A    5/1987
(Continued)

OTHER PUBLICATIONS

Familink operator's guide [searched on the Internet on Nov. 12, 2007] <URL:http://www.sharp.co.jp/support/av/dvd/doc/dvacw80-72_familink.pdf>.

(Continued)

*Primary Examiner* — Steven J Mottola
(74) *Attorney, Agent, or Firm* — Birch, Stewart, Kolasch & Birch, LLP

(57) ABSTRACT

An electronic device (1) constitutes a remote control system (100) together with a remote control device (3) and at least one controlled device (2/2'), and the electronic device (1) includes: a first reception section (20) that receives, from the remote control device, a direct command signal (7/7') broadcasted to the electronic device and the controlled device; a second reception section (23) that receives, from the controlled device, an indirect command signal (8) having been generated by the controlled device according to the direct command signal having been received from the remote control device; and a control section (10) including signal selecting means (31) that selects one intended command signal to which a response is needed from a signal group according to a predetermined rule, the signal group consisting of the direct command signal having been received by the first reception section and the indirect command signal having been received by the second reception section. This makes it possible to properly select and process a signal to be followed in the electronic device where a plurality of command signals are redundantly supplied with respect to one command signal from the remote control device.

32 Claims, 20 Drawing Sheets

U.S. PATENT DOCUMENTS

| | | |
|---|---|---|
| 7,295,252 B2 | 11/2007 | Watanabe et al. |
| 8,154,381 B2 * | 4/2012 | Kohanek ................ 340/3.71 |
| 2003/0142952 A1 | 7/2003 | Oka et al. |
| 2003/0177489 A1 | 9/2003 | Watanabe et al. |
| 2006/0095596 A1 | 5/2006 | Yung et al. |
| 2007/0165997 A1 | 7/2007 | Suzuki et al. |
| 2009/0051565 A1 | 2/2009 | Yung et al. |

FOREIGN PATENT DOCUMENTS

| | | |
|---|---|---|
| JP | 7-250386 A | 9/1995 |
| JP | 2003-179985 A | 6/2003 |
| JP | 2003-224738 A | 8/2003 |
| JP | 2003-274213 A | 9/2003 |
| JP | 2006-135959 A | 5/2006 |
| JP | 2006-332866 A | 12/2006 |
| WO | WO 2005/064982 A1 | 7/2005 |

OTHER PUBLICATIONS

Photo system [searched on the Internet on Nov. 12, 2007] <URL:http://www.sharp.co.jp/familink/photo.html>.

User's manual of digital high-definition recorder, pp. 170-172 [searched on the Internet on Nov. 12, 2007] <URL:http://www.sharp.co.jp/support/av/dvd/doc/dvacw80-72__mn.pdf>.

* cited by examiner

FIG. 6

| ID | CONNECTED DEVICE | SIGNAL | ORDER OF ARRIVAL | ARRIVAL TIME | STATUS |
|---|---|---|---|---|---|
| 1 | MOBILE PHONE | IrSS | 1 | t1 | NOW EXECUTING |
| 2 | STB | HDMI | | | |
| 3 | HDD RECORDER | HDMI | | | |
| .. | .. | .. | .. | .. | .. |

FIG. 10

| ID | CONNECTED DEVICE | SIGNAL | ORDER OF ARRIVAL | ARRIVAL TIME | STATUS |
|---|---|---|---|---|---|
| 1 | MOBILE PHONE | IrSS | 1 | t1 | NOW BLOCKING |
| 2 | STB | HDMI | 3 | t6 | BLOCKING COMPLETED |
| 3 | HDD RECORDER | HDMI | 2 | t4 | BLOCKING COMPLETED |
| .. | .. | .. | .. | .. | .. |

F I G. 1 3

(a)

| ID | CONNECTED DEVICE | SIGNAL | ORDER OF ARRIVAL | ARRIVAL TIME | STATUS |
|---|---|---|---|---|---|
| 1 | MOBILE PHONE | IrSS | 1 | t1 | SUSPENDED |
| 2 | STB | HDMI | | | |
| 3 | HDD RECORDER | HDMI | | | |
| .. | .. | .. | .. | .. | .. |

(b)

| ID | CONNECTED DEVICE | SIGNAL | ORDER OF ARRIVAL | ARRIVAL TIME | STATUS |
|---|---|---|---|---|---|
| 1 | MOBILE PHONE | IrSS | 1 | t1 | BLOCKING COMPLETED |
| 2 | STB | HDMI | | | |
| 3 | HDD RECORDER | HDMI | 2 | t4 | NOW EXECUTING |
| .. | .. | .. | .. | .. | .. |

(c)

| ID | CONNECTED DEVICE | SIGNAL | ORDER OF ARRIVAL | ARRIVAL TIME | STATUS |
|---|---|---|---|---|---|
| 1 | MOBILE PHONE | IrSS | 1 | t1 | BLOCKING COMPLETED |
| 2 | STB | HDMI | 3 | t5 | BLOCKING COMPLETED |
| 3 | HDD RECORDER | HDMI | 2 | t4 | NOW EXECUTING |
| .. | .. | .. | .. | .. | .. |

F I G. 1 6

(a)

| ID | CONNECTED DEVICE | SIGNAL | ORDER OF ARRIVAL | ARRIVAL TIME | STATUS | TARGET DEVICE |
|---|---|---|---|---|---|---|
| 1 | MOBILE PHONE | IrSS | 1 | t1 | BLOCKING COMPLETED | × |
| 2 | STB | HDMI | | | | × |
| 3 | HDD RECORDER | HDMI | | | | ○ |
| .. | .. | .. | .. | .. | .. | .. |

(b)

| ID | CONNECTED DEVICE | SIGNAL | ORDER OF ARRIVAL | ARRIVAL TIME | STATUS | TARGET DEVICE |
|---|---|---|---|---|---|---|
| 1 | MOBILE PHONE | IrSS | 1 | t1 | BLOCKING COMPLETED | × |
| 2 | STB | HDMI | | | | × |
| 3 | HDD RECORDER | HDMI | 2 | t4 | NOW EXECUTING | ○ |
| .. | .. | .. | .. | .. | .. | .. |

(c)

| ID | CONNECTED DEVICE | SIGNAL | ORDER OF ARRIVAL | ARRIVAL TIME | STATUS | TARGET DEVICE |
|---|---|---|---|---|---|---|
| 1 | MOBILE PHONE | IrSS | 1 | t1 | BLOCKING COMPLETED | × |
| 2 | STB | HDMI | 3 | t6' | BLOCKING COMPLETED | × |
| 3 | HDD RECORDER | HDMI | 2 | t4 | EXECUTION COMPLETED | ○ |
| .. | .. | .. | .. | .. | .. | .. |

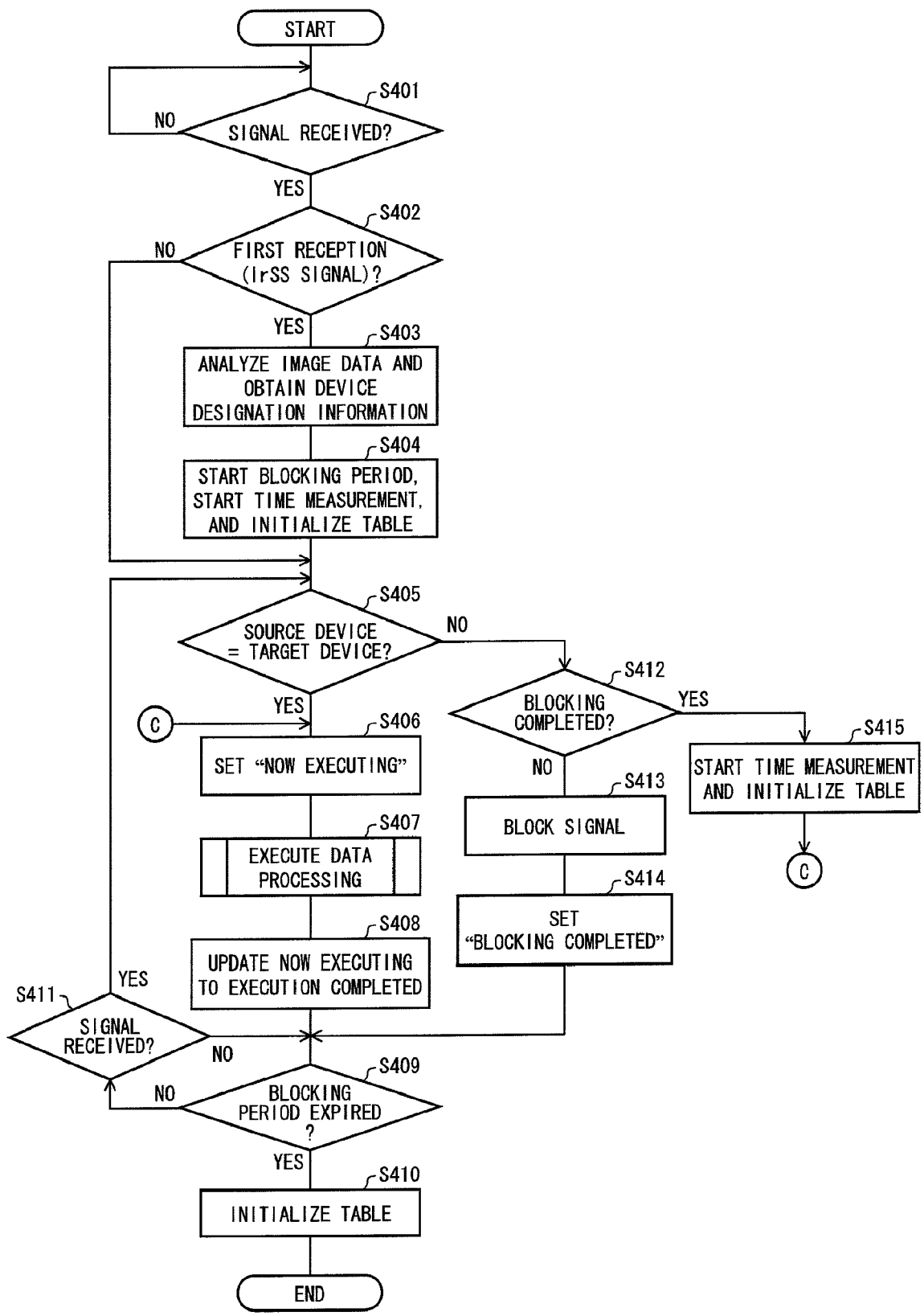

ELECTRONIC DEVICE, REMOTE CONTROL SYSTEM, SIGNAL PROCESSING METHOD, CONTROL PROGRAM AND RECORDING MEDIUM

TECHNICAL FIELD

The present invention relates to an electronic device that processes signals, a remote control system, a signal processing method, a control program, and a recording medium.

BACKGROUND ART

Conventionally, remote controlling has been performed through infrared data communications by transmission of a command signal from a remote control device (remote controller) to a plurality of devices to be controlled.

Portable devices (mobile phone, digital camera, etc.) having been recently in widespread use support a high-speed infrared communication protocol, such as IrSS® communications. From the portable devices, images can be directly transmitted to various audio/visual devices (IrSS-compliant devices) for use at home. This allows the portable device to be used in the same manner as a remote controller, thereby enabling image storage in a HDD recorder and image display on a television set, and the like operations. In this manner, a plurality of devices can be remotely controlled by using only such a portable device (e.g. Non-Patent Literature 1, etc.).

Meanwhile, individual devices are connected to each other via an interface realized through wired or wireless connection. Such a connection between the devices realizes one-way signal transmission or two-way signal transmission.

Recently, connection between audio/visual devices, for example, have been made via a digital video and audio input/output interface, such as HDMI (High Definition Multimedia Interface), which enables transmission and reception of video, audio, and command signals between the individual devices. This allows the audio/visual devices to control other audio/visual devices or to operate according to commands from other audio/visual devices (e.g. Non-Patent Literature 2, etc.).

Non-Patent Literature 1
Photo system
[searched on the Internet on Nov. 12, 2007]
<URL: http://www.sharp.co.jp/familink/photo.html>
Non-Patent Literature 2
Familink operator's guide
[searched on the Internet on Nov. 12, 2007]
<URL: http://www.sharp.co.jp/support/av/dvd/doc/dvacw80-72_familink.pdf>
Non-Patent Literature 3
User's manual of digital high-definition recorder, p. 171
[searched on the Internet on Nov. 12, 2007]
<URL: http://www.sharp.co.jp/support/av/dvd/doc/dvacw80-72_mn.pdf>

SUMMARY OF INVENTION

Technical Problem

In the aforementioned conventional remote control system, the controlled devices are directly operated by a command signal from one remote controller. Further, in a case where the individual controlled devices control another and are controlled by another through the aforementioned connection between the devices, the following problems arise.

For example, assume that there is a remote control system where device A (electronic device) and device B (controlled device), both of which are devices controlled by one remote controller, are connected via a particular interface, so that a signal (signal to be processed, such as command signal, video signal, and/or audio signal) can be transmitted from the device B to the device A.

In this case, if the individual devices are placed under a situation where both of the devices can receive a single command signal from the remote controller (for example, if the individual devices are placed in a state where their respective infrared light receiving sections are very close to the remote controller), the misoperation occurs that a command signal intended for the device A is received and processed by the device B.

Furthermore, in a case where a command of the command signal from the remote controller is, for example, "Let the device A execute processing X", the device A receives a plurality of signals with respect to one command, and accordingly executes the processing X at several times rather than once.

This is because the device A redundantly receives the following two signals: (1) a command signal having been transmitted from the remote controller to command the device A to execute the processing X; and (2) a command signal that the device B has transmitted to the device A via the interface according to the command signal (1) from the remote controller so as to command the device A to execute the processing X (or a signal to be processed for the processing X). In this case, if the command signal having been directly supplied to the device A is an intended command signal, it means that the device A performs needless and redundant operations. It can no longer be said that it is a desirable situation from the viewpoint of an overall system. Even in a case where the intended command signal is supplied to the device B, it is no different from the above case, and needless operations unfortunately occur in the individual devices.

For the remote controller that remotely controls a plurality of devices, there have been conventionally provided a large number of techniques for prevention of misoperations. However, such techniques require the functions for realizing the prevention of misoperations to be squeezed into the remote controller. This causes the remote controller itself to have a complicated configuration, resulting in increase in size and manufacturing cost of the remote controller and poor operability for the user.

Moreover, the foregoing problems occur not only in audio/visual devices that process digital signals, but also in controlled devices that can redundantly receive a plurality of signals with respect to one command from the remote controller.

The present invention has been attained in view of the foregoing problems, and an object of the present invention is to realize an electronic device, a remote control system, a signal processing method, a control program, and a recording medium, all of which enable the electronic device to properly process incoming signals so that the electronic device operates only based on a signal to be followed, in a remote control system where the electronic device can redundantly receive a plurality of command signals corresponding to one command signal from the remote controller.

Solution to Problem

In order to solve the foregoing problems, an electronic device of the present invention is an electronic device constituting a remote control system together with a remote control device and at least one controlled device that receives a direct command signal broadcasted by the remote control device, the electronic device comprising: a first reception section that receives, from the remote control device, a direct command signal broadcasted to the electronic device and the at least one controlled device; a second reception section that receives, from the at least one controlled device, an indirect command signal having been generated by the at least one controlled device according to the direct command signal having been received from the remote control device; and a control section comprising signal selecting means that selects one intended command signal to which a response is needed from a signal group according to a predetermined rule, the signal group consisting of the direct command signal having been received by the first reception section and the at least one indirect command signal having been received by the second reception section.

According to the above arrangement, in the remote control system, when the remote control device broadcasts the direct command signal, the electronic device and the controlled device(s) placed within a command signal output range receives the same direct command signal. The electronic device receives the direct command signal at the first reception section.

Meanwhile, the controlled device generates the indirect command signal according to the received direct command signal. Then, the controlled device transmits the generated indirect command signal to the electronic device.

The electronic device receives the indirect command signal at the second reception section. The number of indirect command signals received by the electronic device is equal to the number of controlled devices provided in the remote control system.

Here, one direct command signal directly having been received from the remote control device and at least one indirect command signal corresponding to the direct command signal are supplied to the electronic device. However, one command signal is transmitted from the remote control device to the electronic device. Therefore, the electronic device has to respond to one intended signal in this signal group. The other signals are overlapping signals to be ignored.

In view of this, the signal selecting means selects one intended command signal to which a response is needed from among a plurality of command signals that belong to the above signal group, according to a predetermined rule.

This enables the electronic device to properly select an intended command signal to be followed even when the electronic device receives the signal group consisting of a plurality of overlapping command signal with respect to one command signal from the remote control device. Therefore, it is possible to prevent the occurrence of needless and redundant operations.

In order to solve the foregoing problems, a remote control system of the present invention comprises: a remote control device; at least one controlled device that receives a direct command signal broadcasted by the remote control device; and any one of the foregoing electronic devices.

In order to solve the foregoing problems, a signal processing method of the present invention is a signal processing method for an electronic device constituting a remote control system together with a remote control device and at least one controlled device that receives a direct command signal broadcasted by the remote control device, the signal processing method comprising: a direct command signal receiving step of receiving, from the remote control device, a direct command signal broadcasted to the electronic device and the at least one controlled device; an indirect command signal receiving step of receiving, from the at least one controlled device, an indirect command signal having been generated by the at least one controlled device according to the direct command signal having been received from the remote control device; and a signal selecting step of selecting one intended command signal to which a response is needed from a signal group according to a predetermined rule, the signal group consisting of the direct command signal having been received in the direct command signal receiving step and the at least one indirect command signal having been received in the indirect command signal receiving step.

Advantageous Effects of Invention

In order to solve the foregoing problems, an electronic device of the present invention is an electronic device constituting a remote control system together with a remote control device and at least one controlled device that receives a direct command signal broadcasted by the remote control device, the electronic device comprising: a first reception section that receives, from the remote control device, a direct command signal broadcasted to the electronic device and the at least one controlled device; a second reception section that receives, from the at least one controlled device, an indirect command signal having been generated by the at least one controlled device according to the direct command signal having been received from the remote control device; and a control section comprising signal selecting means that selects one intended command signal to which a response is needed from a signal group according to a predetermined rule, the signal group consisting of the direct command signal having been received by the first reception section and the at least one indirect command signal having been received by the second reception section.

In order to solve the foregoing problems, a remote control system of the present invention comprises: a remote control device; at least one controlled device that receives a direct command signal broadcasted by the remote control device; and any one of the foregoing electronic devices.

In order to solve the foregoing problems, a signal processing method of the present invention is a signal processing method for an electronic device constituting a remote control system together with a remote control device and at least one controlled device that receives a direct command signal broadcasted by the remote control device, the signal processing method comprising: a direct command signal receiving step of receiving, from the remote control device, a direct command signal broadcasted to the electronic device and the at least one controlled device; an indirect command signal receiving step of receiving, from the at least one controlled device, an indirect command signal having been generated by the at least one controlled device according to the direct command signal having been received from the remote control device; and a signal selecting step of selecting one intended command signal to which a response is needed from a signal group according to a predetermined rule, the signal group consisting of the direct command signal having been received in the direct command signal receiving step and the at least one indirect command signal having been received in the indirect command signal receiving step.

The above arrangements yield the following effect. That is, in a remote control system where the electronic device can redundantly receive a plurality of command signals corresponding to one command signal from the remote controller, it is possible for the electronic device to properly process incoming signals to the electronic device so that the electronic device operates according to only a signal to be followed.

BRIEF DESCRIPTION OF DRAWINGS

FIG. 6 is a view showing a specific example of a signal management table referenced by a signal selecting section of the main control section.

FIG. 10 is a view showing another specific example of the signal management table referenced by the signal selecting section of the main control section.

FIG. 13

(a) through (c) of FIG. 13 are views showing specific examples of a signal management table at a certain point in time in a digital television set in the embodiment of the present invention.

Figure 14:
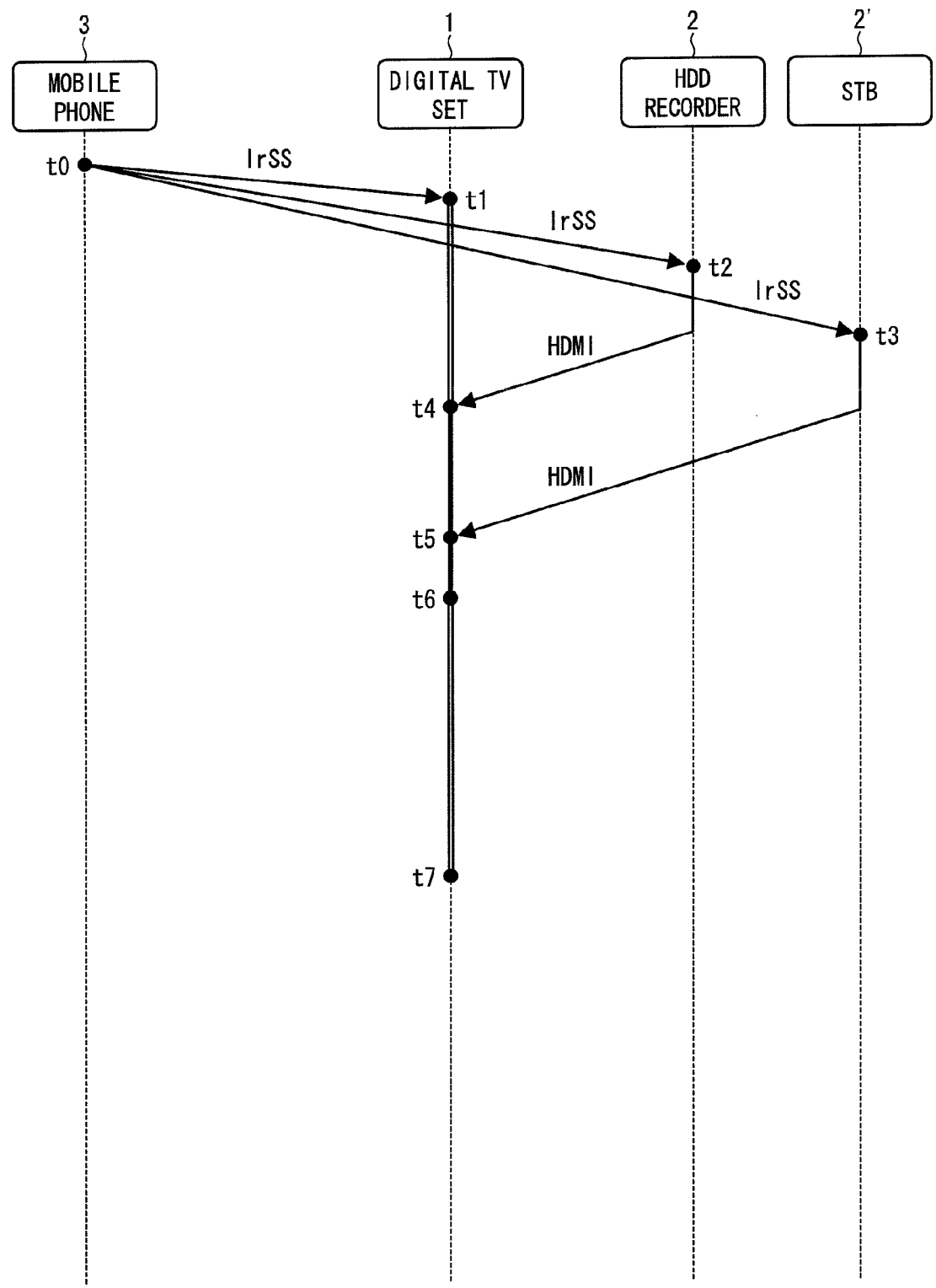

FIG. 14 is a sequence diagram showing timings of signal transmission/reception to/from a mobile phone, a digital television set, a HDD recorder, and an STB all of which constitute the photograph display system in still another embodiment of the present invention.

Figure 15:
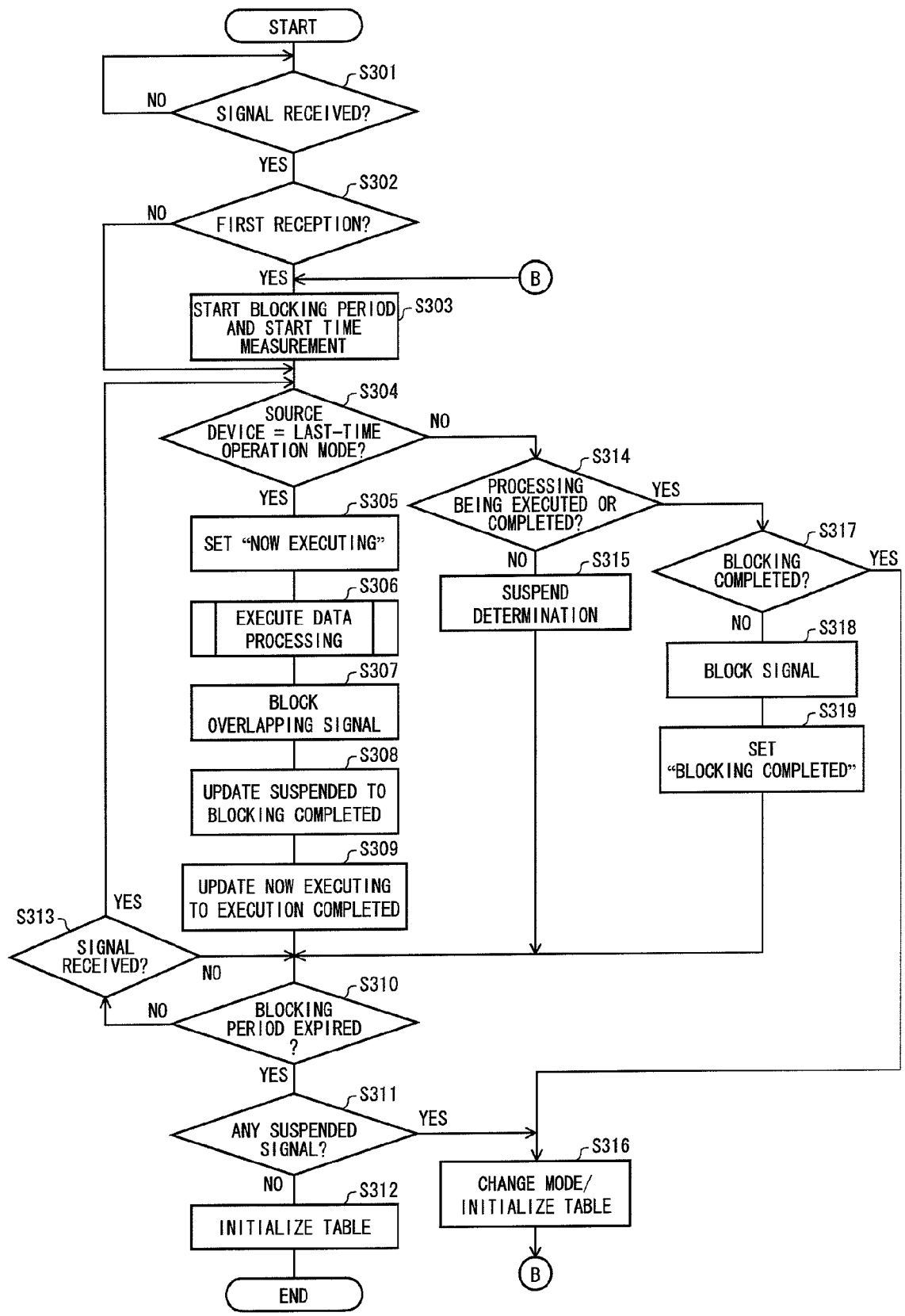

FIG. 15 is a flow chart showing a flow of processing performed by the digital television set in still another embodiment of the present invention.

FIG. 16

(a) through (c) of FIG. 16 are views showing specific examples of a signal management table at a certain point in time in the digital television set in yet another embodiment of the present invention.

FIG. 17 is a flow chart showing a flow of processing performed by the digital television set in yet another embodiment of the present invention.

FIG. 18

Figure 18:
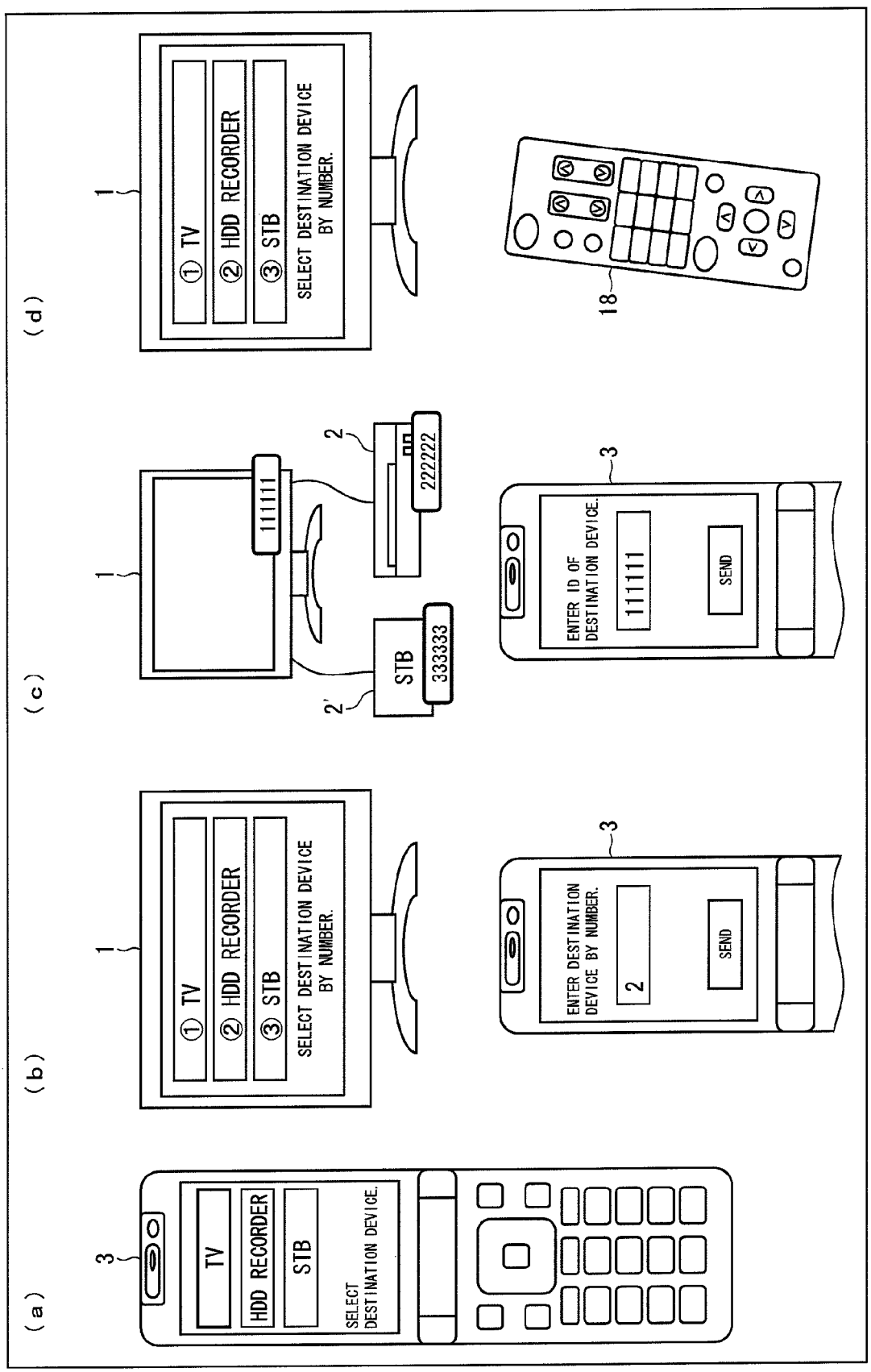

(a) through (d) of FIG. 18 are views showing examples of a menu screen that prompts the user to designate a desired device to process operation-use image data in advance before a mobile phone transmits the operation-use image data.

Figure 19:
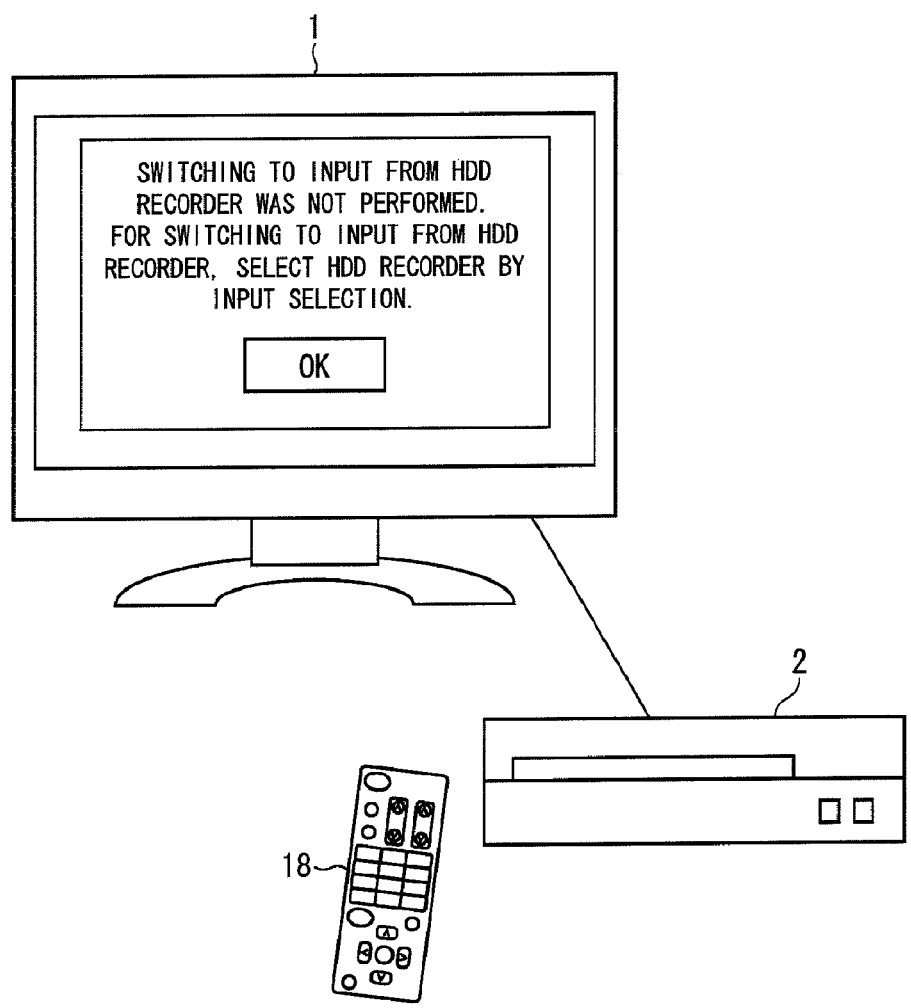

FIG. 19 is a view showing an example of a menu screen that prompts the user to designate a desired device to process operation-use image data after a mobile phone transmits the operation-use image data.

Figure 20:
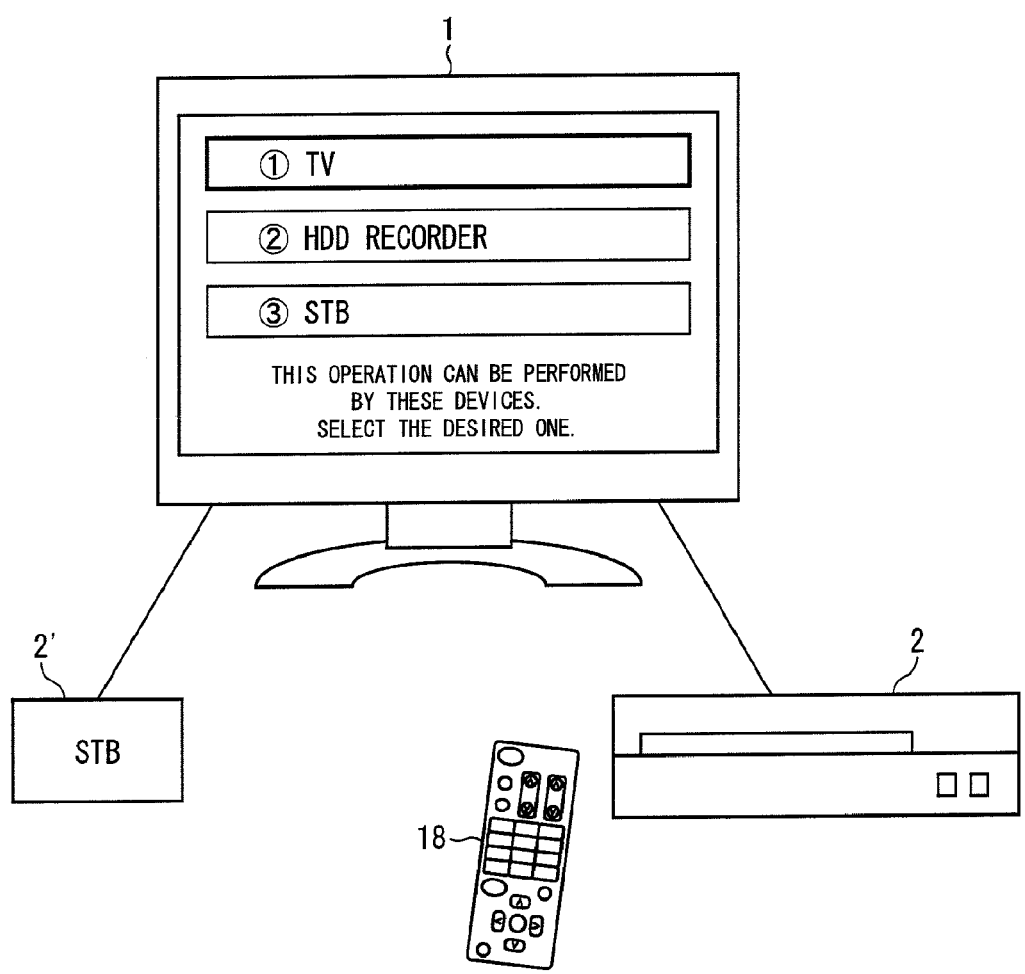

FIG. 20 is a view showing an example of a menu screen that prompts the user to designate a desired device to process operation-use image data after a mobile phone transmits the operation-use image data.

REFERENCE SIGNS LIST 1 digital television set (electronic device)
2 HDD recorder (controlled device)
2' set-top box (controlled device)
3 mobile phone (remote control device)
4 service offering server
5 Internet
6 HDMI cable
7 image data (direct command signal/command signal)
7' operation-use image data (direct command signal/command signal)
8 HDMI signal (indirect command signal/command signal)
9 broadcast station
10 main control section (control section/signal processing device)
11 video switching section (video signal generating means)
12 display control section
13 display section
14 application group (command signal processing section/video signal generating means)
15 OSD processing section
16 storage section
17 temporary storage section
18 operation section
19 operation signal receiving section (third reception section)
20 infrared communication section (first reception section)
21 image data analyzing section
22 video signal converting section (command signal processing section/video signal generating means)
23 HDMI signal processing section
   (second reception section/command signal processing section/video signal generating means)
24 communication section
25 communication data processing section (command signal processing section)
26 broadcast data receiving section
27 broadcast data processing section
   (command signal processing section/video signal generating means)
30 input signal managing section (input signal managing means)
31 signal selecting section (signal selecting means)
32 signal blocking section (signal blocking means)
33 switching instructing section
34 application executing section
   (command signal processing section/video signal generating means)
35 timer section (time measuring means)
36 dialog processing section (dialog processing means)
37 blocking period calculating section (blocking period calculating means)
100 photograph display system (remote control system)
161 signal management table
162 mode storage section

DESCRIPTION OF EMBODIMENTS

The following will describe one embodiment of the present invention with reference to drawings. In the present embodiment, the present invention will be explained intelligibly with the following specific examples. That is, the present embodiment will be explained in a case where a signal processing device of the present invention is applied to a digital television set including provisions for IrSS® communications. Further, in the present embodiment, a photograph display system where photographs are displayed on the digital television set by using a mobile phone including provisions for IrSS® communications is explained as a specific example of a remote control system of the present invention. However, the present invention is not limited to the above specific examples.

[Photograph Display System]

Figure 2:
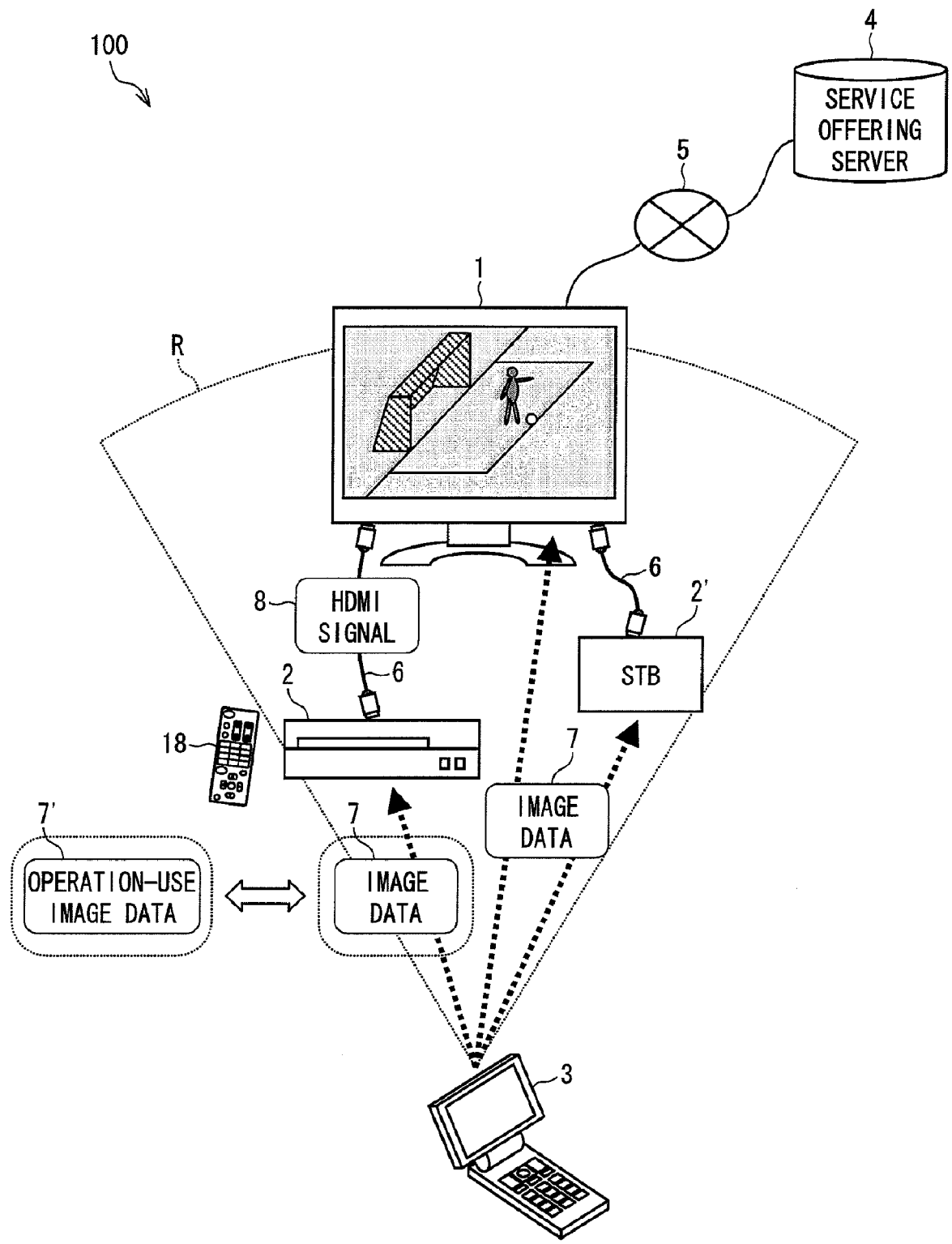
FIG. 2 is a view schematically showing the configuration of a photograph display system in the embodiment of the present invention.

FIG. 2 is a view schematically showing the configuration of a photograph display system 100 in the embodiment of the present invention.

The photograph display system 100 is a system for displaying photographs on a digital television set 1, and every kind of devices intercommunicatively connected to the digital television set 1 can offer photographs to the digital television set 1. The photograph display system 100 in the present embodiment includes, as shown in FIG. 2, the digital television set 1, a hard disk (HDD) recorder 2, a set-top box (STB) 2', a mobile phone 3, and a service offering server 4. These are just a few examples.

The digital television set 1, the HDD recorder 2, and the STB 2' are audio/visual devices for use at home. Each of these devices has the function of receiving infrared data transmitted from the mobile phone 3 and then performing operations accordingly. It is assumed herein that the mobile phone 3 transmits infrared data, i.e. image data 7 or operation-use image data 7' to each device through communications of IrSS®, which is a high-speed infrared communications protocol. This enables the mobile phone 3 to remotely control each audio/visual device placed in an infrared output range R. The IrSS® communications, which is just an example of communications, may be replaced by any other wireless communications that enables broadcasting.

Further, the digital television set 1 and other devices (HDD recorder 2 and STB 2') are connected to each other via HDMI cables 6. The devices connected to the digital television set 1 via the HDMI cables 6 can transmit/receive video signals, audio signals, and command signals in combination with each other. Specifically, the HDD recorder 2 can convert still images and moving images stored therein (or received from the mobile phone 3) into video signals to output the video signals as HDMI signals 8 to the digital television set 1. The connection using the HDMI cable, which is just an example of connection, may be replaced by any other cable connection using Ethernet® cable, PLC, etc. or any other wireless connection through a wireless LAN, etc.

Still further, the digital television set 1 has the function of performing communications with the service offering server 4 and other external devices via an external communications network such as Internet 5. This enables the digital television set 1 to obtain various kinds of services offered by the service offering server 4. It is assumed herein that the service offering server 4 offers a "network album service", which is display of photographs taken by a digital camera or the like on the digital television set 1 in a form like an album. More specifically, the service offering server 4 distributes photographs and offers an application for photograph display (hereinafter referred to as network photo application) to the digital television set 1 via the Internet 5.

Note that in the photograph display system 100 of the present embodiment, the audio/visual devices for use at home may be controlled by an operation section 18 that serves as the conventional remote controller. Complicated functions tailored to the individual audio/visual devices (programming on the digital television set 1 for recording through an EPG, recording/reproduction of programs with use of the HDD recorder 2, etc.) may be performed by means of the operation section 18.

As described above, the photograph display system 100 enables offering of photographs to the digital television set 1 via various kinds of communication means provided in the individual devices and display of the photographs on the digital television set 1.

[Data Structure of Each Signal]

Figure 3:
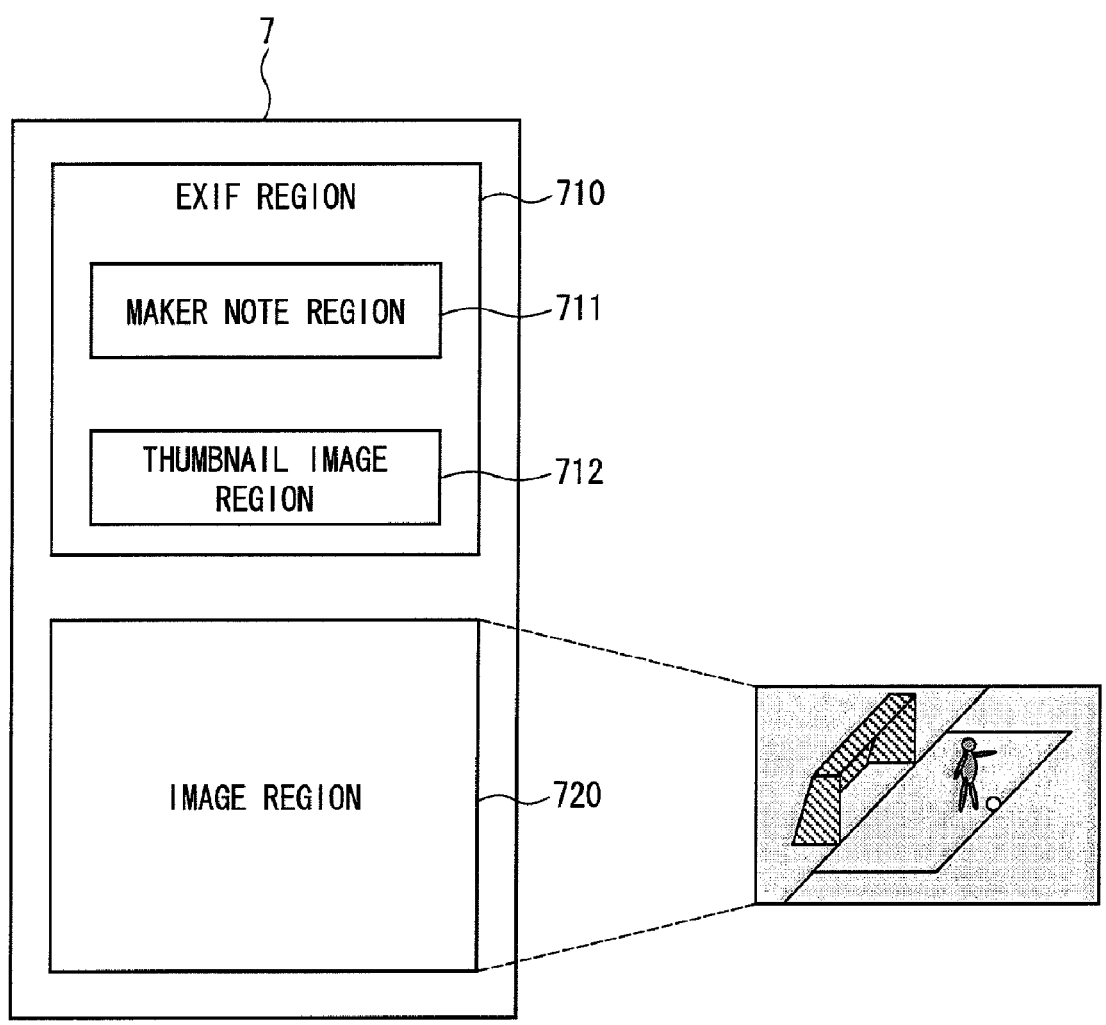
FIG. 3 is a data structure diagram schematically showing data structure of image data.

FIG. 3 is a data structure diagram schematically showing data structure of the image data 7. As shown in FIG. 3, the image data 7 is data in JPEG format, including an image region 720 and an EXIF region 710.

The image region 720 is a region for compressed storage of image information to be displayed. Meanwhile, the EXIF information 710 is a region for storage of meta-information regarding image information stored in the image region 720. The EXIF region 710 includes a maker note region 711 that can be used by a manufacturer of a digital camera or the like product according to a desired specification selected by the manufacturer. The EXIF region 710 further includes a thumbnail image region 712 for storage of thumbnail images that are miniature representations of main images stored in the image region 720.

The mobile phone 3 transmits the image data 7 in JPEG format shown in FIG. 3 directly to each audio/visual device, so that an image contained in the image data 7 can be displayed on the digital television set 1.

Figure 4:
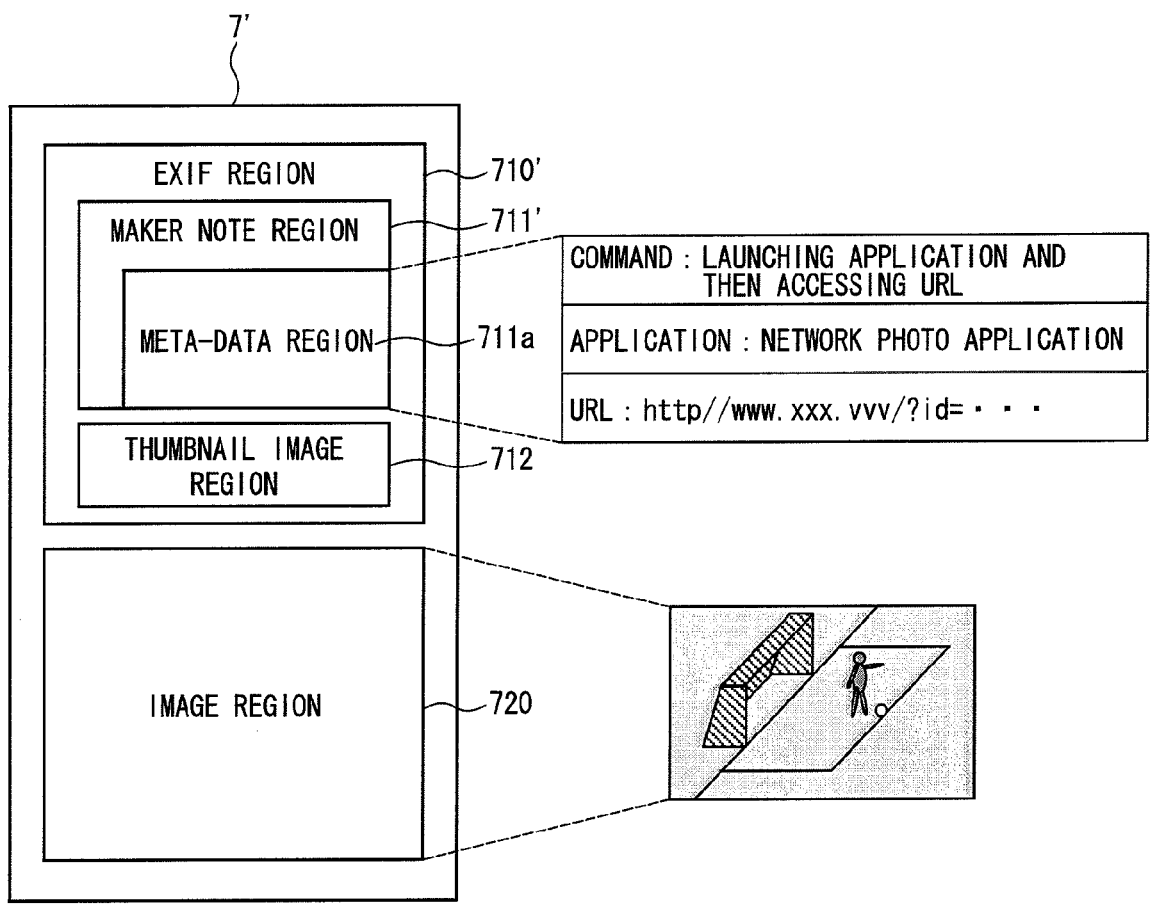
FIG. 4 is a data structure diagram schematically showing data structure of operation-use image data.

FIG. 4 is a data structure diagram schematically showing data structure of the operation-use image data (direct command signal) 7'. As shown in FIG. 4, the operation-use image data 7' is data in JPEG format, including the image region 720 and an EXIF region 710'. This is a feature in common with the image data 7.

The operation-use image data 7' is different from the image data 7 in that the operation-use image data 7' includes processing designation information that is a command for causing each audio/visual device to execute a particular operation. That is, transmission of the operation-use image data 7' from the mobile phone 3 to the digital television set 1 enables the audio/visual device to execute every kind of operations other than the operation of display of an image stored in the image region 720. This enables the mobile phone 3 to be used like a remote controller.

The operation-use image data 7' used to operate each audio/visual device is realized by storage of the processing designation information in the aforementioned maker note region 711'. Specifically, the processing designation information is stored in a particular region (a meta-data region 711a) allocated in the maker note region 711'. The above description has given the exemplary case where the processing designation information is stored in the maker note region. However, the region for storing the processing designation information therein is not limited to the maker note region. Alternatively, the processing designation information may be stored in any other region, such as an application region or a comment region. Besides, the operation-use image data 7' containing the processing designation information is not limited to data in JPEG format.

In the exemplary case shown in FIG. 4, the processing designation information for designating the following processing: launching the application named "network photo application" and then accessing the following URL: http//www.xxx.vvv/?id= . . . is stored.

Transmission of the operation-use image data 7' shown in FIG. 4 from the mobile phone 3 to the digital television set 1 enables the digital television set 1 to launch the application and then display a page at the above URL.

As described in the aforementioned example, the contents of the image region 720 and the thumbnail image region 712 may be irrelevant to the nature of processing (processing designation information) to be executed by the digital television set 1. That is, for transmission of the processing designation information to a target device, the image region 720 and the thumbnail image region 712 can be used as desired.

For example, the image region 720 and the thumbnail image region 712 may store an image representing the nature of processing which is designated by the processing designation information stored in the maker note region 711', i.e. an icon image. With this arrangement, display of the operation-use image data 7' on the mobile phone 3 in the same manner as the normal image data 7 enables the user to know what processing the operation-use image data 7' is about.

Alternatively, the image region 720 and the thumbnail image region 712, just as in the case with the image data 7, may store an image of a photograph to be displayed and the like. This realizes the followings: displaying the image corresponding to the operation-use image data 7' (image stored in the image region 720) on the digital television set 1 which has received the operation-use image data 7'; and subjecting such image to image processing designated by the processing designation information in the operation-use image data 7'.

[Problem Caused by the Photograph Display System]

As shown in FIG. 2, the digital television set 1, upon receipt of the image data 7 shown in FIG. 3 from the mobile phone 3, subjects an image stored in the image region 720 of the image data 7 to processing for display of the image. Meanwhile, upon receipt of the image data 7 from the mobile phone 3, the HDD recorder 2, for display of the image data 7 on the digital television set 1, converts the image stored in the image region 720 into a video signal in a form suitable for carrying it on the HDMI signal 8, and then outputs the video signal together with an input switching request signal to the digital television set 1. The digital television set 1 performs switching to input from the HDD recorder 2 according to the HDMI signal 8 having been received from the HDD recorder 2, and then displays the video signal supplied from the HDD recorder 2 thereon.

In this case, if the conventional digital television set 1 and HDD recorder 2 are placed in such a state that both of them can receive the image data 7 from the mobile phone 3, one problem arises. That is, as described previously, a plurality of command signals are redundantly supplied to the digital television set 1 with respect to one command from the mobile phone 3.

More specifically, the digital television set 1 having received the image data 7 processes the image data 7 so that the image stored in the image region 720 is subjected to processing for display. Meanwhile, the HDD recorder 2 processes the image stored in the image region 720 to generate a corresponding video signal, and then outputs to the digital television set 1 the video signal, as the HDMI signal 8, together with the input switching request signal that requests for switching to input from the HDD recorder 2.

The digital television set 1 performs the process of displaying the video signal from the HDD recorder 2 thereon according to the input switching request signal (e.g. see Non-Patent Literature 3, page 171). This causes the digital television set 1 to display the image thereon by displaying thereon the corresponding video signal having been transmitted via the HDD recorder 2, even though the digital television set 1 is able to directly respond to an infrared signal from the mobile phone 3 and display the same image thereon.

This causes a needless switching process, i.e. passage through the HDD recorder 2. Moreover, due to the passage through the HDD recorder 2, it takes much time before the image is displayed on the digital television set 1. The lapse of a long response time imposes inconvenience in operating on the user. In another case, when the digital television set 1 receives the HDMI signal 8 from the HDD recorder 2 after directly responding to the image data 7 from the mobile phone 3 to display the corresponding image, the processing that is an already completed response (image display processing) is redundantly performed again. Redundancy of a plurality of operations in response to a single operation of the mobile phone 3 is inconvenient for the user, and is not practical from the viewpoint of the photograph display system 100.

Moreover, when the single operation-use image data 7' shown in FIG. 4 is received by both the digital television set 1 and the HDD recorder 2, another problem arises. That is, the problem occurs that a plurality of different command signals are supplied with respect to a single command from the mobile phone 3.

More specifically, the digital television set 1 having received the operation-use image data 7' shown in FIG. 4 processes the operation-use image data 7' and operates according to the processing designation information that instructs the digital television set 1 "to execute then application and then access the URL". For example, the digital television set 1 launches the network photo application, makes access to the service offering server 4, and then displays an album page designated by the URL (result A). Meanwhile, the HDD recorder 2, if not being provided with the function of analyzing the processing designation information, performs operations as in the previously described case. That is, the HDD recorder 2 subjects the image stored in the image region 720 to processing and then outputs the HDMI signal 8 to the digital television set 1 so that the image is displayed on the digital television set 1. The digital television set 1 performs switching to input from the HDD recorder 2 according to the input switching request signal from the HDD recorder 2, and then displays the image stored in the image region 720 (result B).

If the result A is a result desired by the user, the result B rather than the result A is outputted through the input switching operation of the digital television set 1. This means that the photograph display system 100 is not operated as intended by the user and is not therefore established as a system. Even if the result B is a result desired by the user, needless processing for output of the result A is performed on the digital television set 1, which results in an undesired system.

In order to solve the foregoing problems, the photograph display system 100 of the present invention is arranged such that the digital television set 1 includes a signal processing device for properly processing signals. First of all, the following will describe a general configuration of the digital television set 1 including the signal processing device.

[Configuration of the Digital Television Set]

Figure 5:
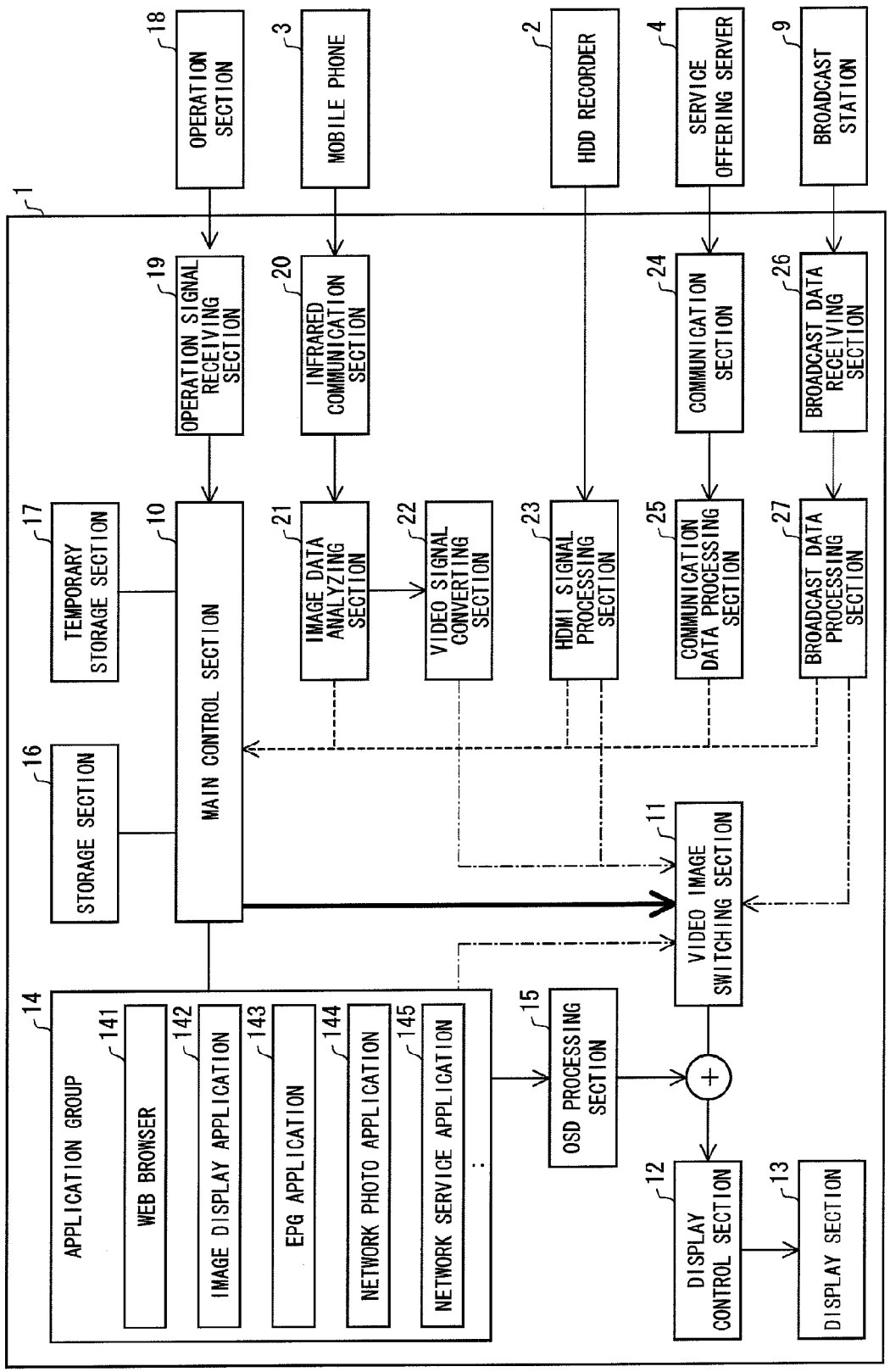
FIG. 5 is a block diagram schematically showing a digital television set in an embodiment of the present invention.

FIG. 5 is a block diagram schematically showing the digital television set 1 according to an embodiment of the present invention.

As shown in FIG. 5, the digital television set 1 includes a main control section 10, a video image switching section 11, a display control section 12, a display section 13, an application group 14, an OSD processing section 15, a storage section 16, a temporary storage section 17, an operation signal receiving section 19, an infrared communication section 20, an image data analyzing section 21, a video signal converting section 22, an HDMI signal processing section 23, a communication section 24, a communication data processing section 25, a broadcast data receiving section 26, and a broadcast data processing section 27.

The main control section 10 controls various operations of the components of the digital television set 1. The main control section 10 retrieves various programs stored in the storage section 16 or applications contained in the application group 14 to control the components of the digital television set 1 of the present invention, so that various functions of the digital television set 1 are realized. Details of the main control section 10 that operates as the signal processing device of the present invention will be described later.

The storage section 16 stores: programs executed by the main control section 10, i.e. (1) programs for controlling the components, (2) an OS program, (3) application programs, (4) a signal processing function program for a signal processing device of the present invention; and various kinds of data retrieved when these programs are to be executed. The storage section 16 is realized by a non-volatile storage device, such as flash memory.

The temporary storage section 17 is realized by a volatile storage device, such as RAM, and used as a working region for the main control section 10 temporarily holding data in the process of executing the foregoing various programs.

The application group 14 shows specific examples of the applications stored in the storage section 16. The digital television set 1 includes herein, to name just a few, a web browser function, an image (photograph) displaying function, an electronic program guide (EPG) outputting/processing function, and a network album display function. These functions are realized by the main control section 10 executing a web browser 141, an image display application 142, an EPG application 143, and the network photo application 144, respectively. The network photo application 144 is one of services offered by the service offering server 4. The network photo application 144 offered by the service offering server 4 is not the only possibility. Various kinds of network service application 145 may be obtained from various external service offering servers.

An execution result of each of the applications is properly converted into a video signal for transfer to the video image switching section 11. Alternatively, in a case where an execution result to be displayed is treated as an object that is superimposed on the video signal for display, the execution result is transferred to the OSD processing section 15.

The operation signal receiving section 19 receives an operation signal transmitted from an operation section 18 and transfers the operation signal to the main control section 10. For example, in a case where the operation signal is an infrared signal, transfer of the operation signal is realized by an infrared light receiving section that receives infrared rays and converts the infrared rays into electrical signals.

The infrared communication section 20 receives image data (image data 7 and operation-use image data 7') transmitted from the mobile phone 3. More specifically, the infrared communication section 20 includes the infrared light receiving section that receives infrared rays emitted from the mobile phone 3 and converts the infrared rays into electrical signals. The infrared communication section 20 converts the electrical signals obtained by the infrared light receiving section into digital data according to a predetermined infrared communications protocol (e.g. IrSS communications), to thereby obtain image data transmitted from the mobile phone 3. The image data having been received by the infrared communication section 20 is stored in the storage section 16, and processed as necessary by the image data analyzing section 21.

The image data analyzing section 21 analyzes the image data having been received by the infrared communication section 20. More specifically, the image data analyzing section 21 analyzes data structure (FIGS. 3 and 4) of the image data and then extracts an image to be processed for display from the image region 720 or the thumbnail image region 712, or extracts the processing designation information from the meta-data region 711a of the maker note region 711. The processing designation information extracted by the image data analyzing section 21 is transferred to the main control section 10. Further, the image having been extracted as an image to be displayed is transferred to the video signal converting section 22. Assume that the received image data has not contained the processing designation information. In this case, instead of transferring the processing designation information to the main control section 10, the image data analyzing section 21 notifies the main control section 10 that the processing designation information has not been contained in the received image data, i.e. that the received image in the image region 720 should be displayed. On the other hand, assume that the received image data has contained the processing designation information. In this case, if the nature of the operation designated by the processing designation information has nothing to do with the image stored in the image region 720, the image data analyzing section 21 may be arranged not to transfer the above image to the video signal converting section 22.

The video signal converting section 22 converts the image having been extracted by the image data analyzing section 21 into a video signal realized by an RGB signal, so that the image is displayed on the display section 13 of the digital television set 1. The image having been converted into a video signal by the video signal converting section 22 is transferred to the video image switching section 11.

The HDMI signal processing section 23 receives the HDMI signal 8 transmitted from a source device (e.g. HDD recorder 2) which is connected via the HDMI cable 6, via an HDMI terminal (second reception section, not shown) included in the digital television set 1, and then processes the HDMI signal 8. Specifically, the HDMI signal processing section 23 obtains, from the HDMI signal, a command signal (the above-described input switching request, etc.) for controlling the operation of the digital television set 1, a video signal and audio signal to be processed, and the like signals. The command signal having been obtained by the HDMI signal processing section 23 is transferred to the main control section 10. The video signal is transferred to the video image switching section 11. The audio signal is transferred to an audio output control section and a speaker (both not shown).

Although not shown herein, the digital television set 1 is provided with the HDMI terminal and the HDMI signal processing section 23, both of which are for receiving the HDMI signal, for each device connected thereto. For example, the HDMI signal from the STB 2' is supplied to the digital television set 1 via a terminal dedicated to the STB 2', and then processed by an HDMI signal processing section 23 dedicated to the STB 2'. The HDMI signal processing section 23 can grasp, on the basis of header information contained in the HDMI signal from its source device, which device is a source device of the received HDMI signal.

The communication section 24 performs transmits/receives data to/from an external device via the Internet 5 or a wide-area network. Assume herein that the communication section 24 receives various services offered by the service offering server 4, as an example. Specifically, the communication section 24 receives data described in a page description language such as XML (eXtensible Markup Language) or HTML, and photograph data to be processed for display (display-use data). The display-use data having been received by the communication section 24 is transferred to the communication data processing section 25. The communication section 24 may receive communication data in any format that is supported by each application of the application group 14 installed in the digital television set 1. The communication data having been received via the communication section 24 is properly transferred by the communication data processing section 25 to a component that can handle the communication data, according to a format of the communication data.

The communication data processing section 25 analyzes the display-use data and communication data having been received by the communication section 24, and then transfers a command signal as an analysis result to the main control section 10 or transfers photograph data, image data, or the like data to be processed for display to an appropriate application executing section of the main control section 10.

The broadcast data receiving section 26 receives signals of a digital broadcast broadcasted from a broadcast station 9, via an antenna. Specifically, the broadcast data receiving section 26 is primarily constituted by a station-selecting section, a digital tuner section, and a demodulating section.

The broadcast data processing section 27 is a TS classifying section that decodes multiplexed digital data having been received by the broadcast data receiving section 26 so as to extract TSs. Each TS packet contains a video/audio signal or a data signal on program information, information required for station selection, etc. The broadcast data processing section 27 classifies TS packets by purpose, and then transfers a TS packet containing a video signal and a TS packet containing an audio signal to the video image switching section 11 and the audio output control section, respectively. Further, the broadcast data processing section 27 transfers a TS packet containing a data signal to be processed by the application group 14 to the main control section 10.

The video image switching section 11 selects input of an appropriate video signal from among a plurality of incoming video signals (alternate long and short dashed lines) according to a command signal (heavy line) from the main control section 10, so as to output a video signal to be displayed on the display section 13 to the display control section 12. The video signals supplied to the video image switching section 11 are, for example, a plurality of outputs from the aforementioned components (communication data processing section 25 (application group 14), video signal converting section 22, HDMI signal processing section 23, broadcast data processing section 27, etc.).

The OSD processing section 15 performs a superimposition process of superimposing an OSD (on-screen display) image, which is an execution result produced by the application group 14, onto the video signal outputted from the video image switching section 11. For example, an electronic program guide (EPG), a menu screen (GUI image) that helps the user to operate the digital television set 1, and the like are superimposed by the OSD processing section 15.

The display control section 12 controls the display section 13 to display the video signal outputted from the video image switching section 11 (if necessary, a video signal on which the OSD image supplied from the OSD processing section 15 is superimposed) on the display section 13. The display control section 12 temporarily writes display screen drawing-use data to be outputted to the display section 13 into the temporary storage section 17, which is realized by a volatile storage device such as RAM, and then stores one screenful of data in a frame buffer (not shown) at a time.

The display section 13 displays various data including photograph data, OSD image data, application execution result data, and display-use data. The display section 13 is realized by, for example, an LCD (liquid crystal display), a PDP (plasma display panel), a CRT (cathode-ray tube) display, or the like display device.

A signal processing device of the present invention for solving the foregoing problems is realized in such a manner that the main control section 10 retrieves a signal processing function program stored in the storage section 16 into the temporary storage section 17, and then executes the signal processing function program. The following will describe the configuration and operations of the main control section 10 as the signal processing device in detail.

[Configuration 1 of the Signal Processing Device]

Figure 1:
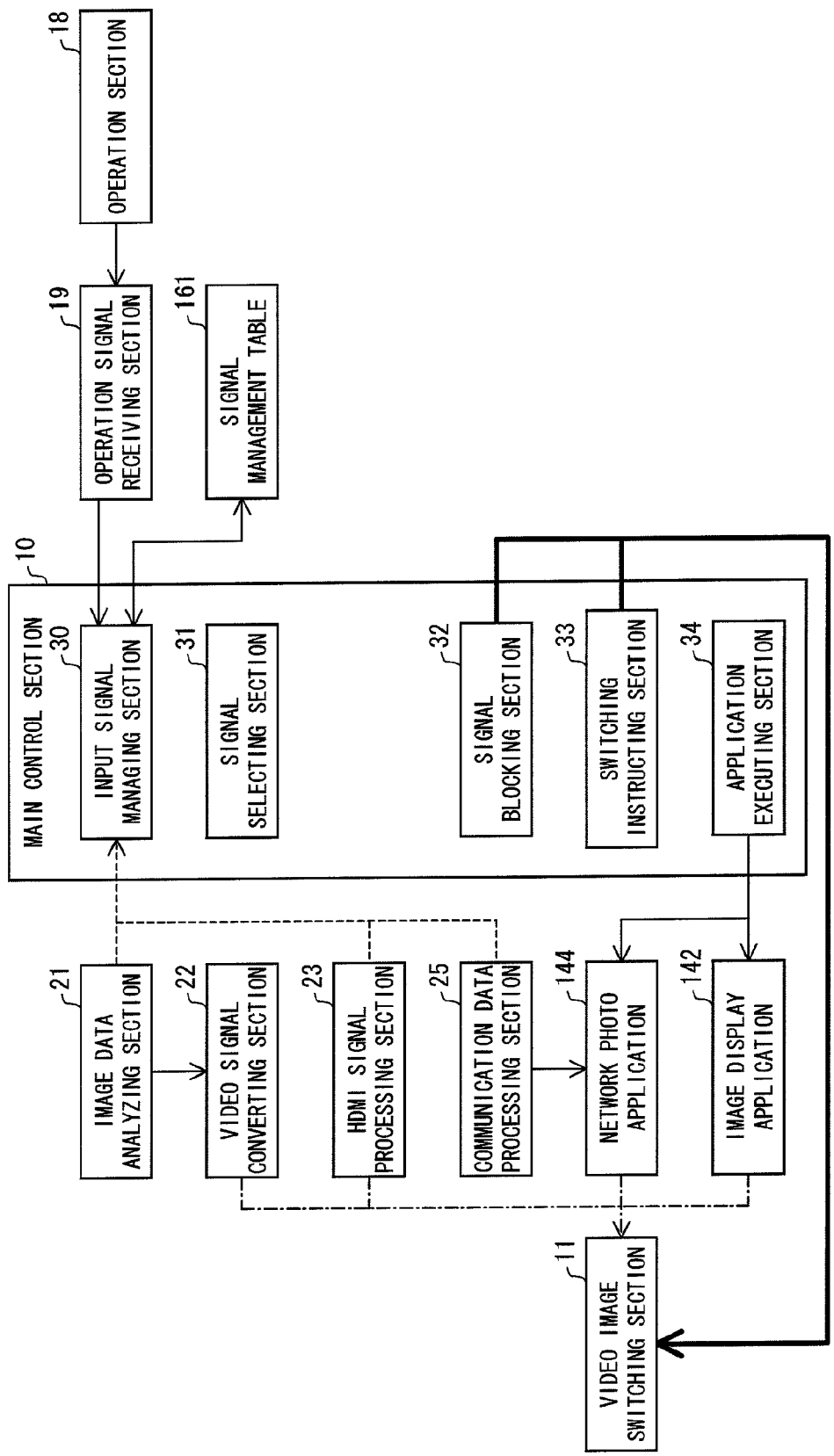
FIG. 1 is a block diagram showing essential components of a main control section of a digital television set in an embodiment of the present invention.

FIG. 1 is a block diagram showing essential components of the main control section 10 as a signal processing device of the present invention. The main control section 10 includes an input signal managing section 30, a signal selecting section 31, a signal blocking section 32, a switching instructing section 33, and an application executing section 34. Reference numerals given to the constituent components shown in FIG. 1 correspond to reference numerals given to the constituent components shown in FIG. 5, and the same reference numerals indicate the same constituent components. Therefore, explanations of the constituent components that have been already described will be omitted.

The input signal managing section 30 manages signals having been transferred from the aforementioned components of the digital television set 1 to the main control section 10. More specifically, the input signal managing section 30 manages incoming signals from all the connected devices that can be connected to the digital television set 1 at home in the photograph display system 100. More specifically, all the connected devices are the mobile phone 3, the HDD recorder 2, and the STB 2' in the example shown in FIG. 2. Therefore, the input signal managing section 30 manages incoming signals for each of the connected devices, using a signal management table 161 stored in the storage section 16. That is, the input signal managing section 30 manages, as one signal group, the following three signals in total:

(1) an IrSS signal directly supplied from the mobile phone 3;

(2) an HDMI signal supplied by way of the HDD recorder 2; and (3) an HDMI signal supplied by way of the STB 2'. These three signals are supplied to the digital television set 1 with respect to one command given by the respect mobile phone 3. This allows the main control section 10 to grasp all the video signals having been supplied (or to be supplied) to the video image switching section 11 in response to one command. From the above first signal group, a single intended signal, i.e. only one intended command signal to which a response is needed (hereinafter referred to as "target signal") is selected.

In a case where a plurality of signals are supplied to the digital television set 1 (main control section 10) in response to transmission of one command (image data 7 or operation-use image data 7') from the mobile phone 3, the signal selecting section 31 selects a single intended signal, i.e. a target signal from a signal group consisting of the plural signals of interest, according to a predetermined rule. Alternatively, every time the digital television set 1 (main control section 10) receives each of the signals in the signal group, the signal selecting section 31 may determine whether or not the signal received is a target signal. The signal selecting section performs signal selection or determination with reference to information in the signal management table 161 and the predetermined rule.

The signal blocking section 32 blocks, for a predetermined period of time, supply of a video signal derived from a signal other than the target signal selected by the signal selecting section 31 to the video image switching section 11. The blocking of the video signal is performed by controlling the video image switching section 11 so that a video signal outputted from the video signal converting section 22 or other component is blocked. In an alternative example, the signal blocking section 32 may control the components so that the components do not output video signals. In another alternative example, the signal blocking section 32 may abandon a command signal itself for instructing output of a video signal so that the command signal is not supplied to the components that output video signals. In still another alternative example, the signal blocking section 32 may abandon video signals outputted from the components.

It is not particularly limited how the signal blocking section 32 determines a duration of the blocking process. In the present embodiment, the signal blocking section 32 blocks a command signal which has not been selected by the signal selecting section 31, i.e. a non-target signal (and a non-target video signal derived from the non-target signal) throughout a time period during which the digital television set 1 performs processing on the target signal.

The switching instructing section 33, if necessary, instructs the video image switching section 11 to perform switching to input of the video signal derived from the target signal selected by the signal selecting section 31. Alternatively, the switching instructing section 33 may be arranged to permit only a component that is to output a target video signal to output the video signal to the video image switching section 11.

The application executing section 34 executes the applications included in the application group 14 (e.g. the network photo application 144, the image display application 142, etc.). Specifically, in a case where the processing designation information is not contained in the image data 7 having been supplied from the mobile phone 3, the application executing section 34 launches the image display application 142 to execute the processing for displaying the image stored in the image region 720 of the image data 7. If the image display application has been already launched, the launching process may be omitted. Alternatively, in a case where the operation-use image data 7' contains the processing designation information and designates the processing for "launching the network photo application and then accessing the URL", the application executing section 34 launches the network photo application 144, receives a page of the album offered by the service offering server 4 via the communication data processing section 25, and executes the processing for displaying the album by means of the network photo application 144. If the network photo application has been already launched, the launching process may be omitted.

Next, the following will describe details of the signal management table 161 managed by the input signal managing section 30.

FIG. 6 is a view showing a specific example of the signal management table 161 referenced by the signal selecting section 31.

The example shown in FIG. 6 depicts a state of the signal management table 161 at a certain point in time (t1) after the transmission (t0) of the command signal (the image data 7 or the operation-use image data 7') from the mobile phone 3.

As shown in FIG. 6, the signals from the aforementioned three devices are managed as the first signal group in the signal management table 161. "ID" and "connected device" name may be anything by which the digital television set 1 can uniquely identify the devices connected to the digital television set 1. "Order of arrival" indicates the order in which the signals of the first signal group have arrived at the digital television set 1 (input signal managing section 30). "Arrival time" indicates a time when the signals of interest have arrived at the input signal managing section 30. In a field of the arrival time shown in FIG. 6, a time given by a clock section (not shown) included in the digital television set 1 may be stored. Alternatively, assuming that a time when any of the signals has arrived first is 0, a time elapsed until the following signal arrives from the time 0 may be stored.

A "status" field stores status information indicating what state the digital television set 1 has entered into (what operation the digital television set 1 has performed) in response to arrival of the signal of interest at the digital television set 1. For example, the status information stored in the "status" field and the definition thereof are as follows:

"Now executing" indicating that processing is now being executed to respond to the signal of interest;

"Execution completed" indicating that the processing has been completed and a response to the signal of interest has been completed;

"Now blocking" indicating that processing is now being executed to respond to the signal of interest, or that a response to the signal of interest has been completed, but the blocking of non-target signals in the same group still continues (i.e. in the period of time during which blocking is now being performed);

"Blocking completed" indicating that blocking of the signal of interest has been completed as the signal of interest is a non-target signal; and "Suspended" indicating that the operation is suspended because a decision is not made about whether the signal of interest is a target signal or a non-target signal at that point in time.

However, the above pieces of status information are just a few examples, and the present invention is not limited thereto.

In a signal processing device of the present invention, a rule under which the signal selecting section 31 selects a target signal is not particularly limited. It is assumed herein that signal processing is executed according to a rule 1 that "among the signals in the signal group, a signal supplied first to the digital television set 1 is a target signal", as an example of the rule. The operations of the main control section 10 under such a circumstance will be described in detail. Further, the following description assumes that a predetermined time period during which a signal is blocked (blocking period) is determined as "a period of time during which data processing is being executed with respect to the target signal".

[Signal Processing Flow]

Figure 7:
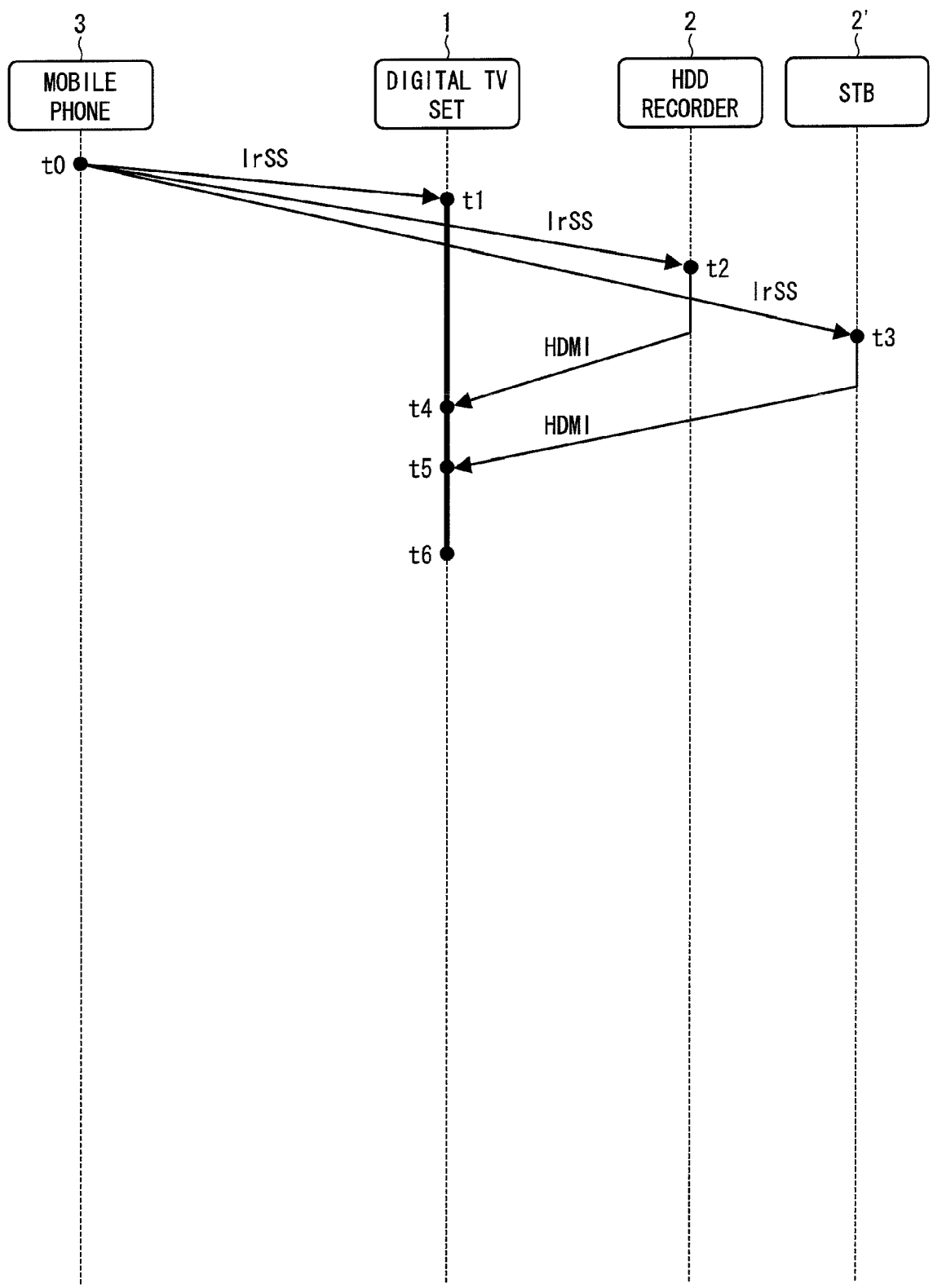
FIG. 7 is a sequence diagram showing timings of signal transmission/reception to/from a mobile phone, a digital television set, a HDD recorder, and an STB all of which constitute the photograph display system in the embodiment of the present invention.
Figure 8:
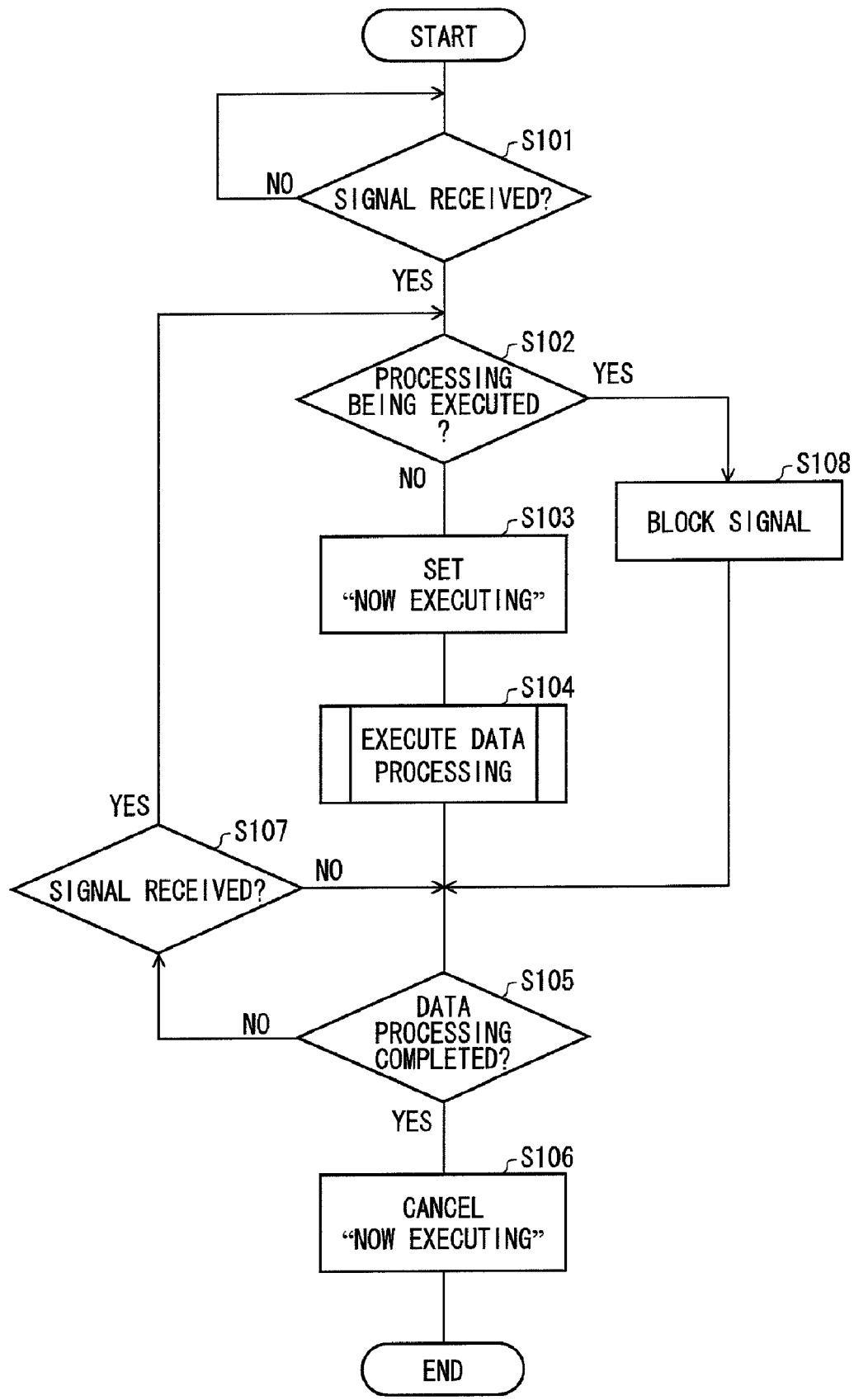
FIG. 8 is a flow chart showing a flow of processing performed by the digital television set in the embodiment of the present invention.

FIG. 7 is a sequence diagram showing timings of signal transmission/reception to/from the individual devices over a period of time between a time (t0) when a command signal is transmitted from the mobile phone 3 and a time (t6) when the digital television set 1 completes the execution of processing according to the target signal while blocking non-target signals. FIG. 8 is a flow chart showing a flow of processing performed by the digital television set 1 over the period of time between the time (t1) when the digital television set 1 receives a first command signal and the time (t6) when processing is executed and completed according to the target signal.

In FIG. 7, a heavy line extending from t1 to t6 for the digital television set 1 indicates a duration of time that the digital television set 1 is executing processing according to the command from the incoming signal.

First, when the user of the mobile phone 3 transmits the image data 7 to the digital television set 1 in the photograph display system 100 shown in FIG. 2 (time t0 in FIG. 7), all of the devices within the infrared output range R of the mobile phone 3 receive the image data 7. In the example shown in FIG. 7, the digital television set 1 (infrared communication section 20), the HDD recorder 2, the STB 2' receive the image data 7 from the mobile phone 3 in the form of IrSS signal at the times t1, t2, and t3, respectively.

Each audio/visual device HDMI-connected to the digital television set 1 processes the image data 7. Meanwhile, when the digital television set 1 receives the signal at t1 (hereinafter referred to as signal t1) (YES in S101), as shown in FIG. 8, the digital television set 1 starts signal processing to properly respond to the received signal (and other signals that belong to the same signal group). The input signal managing section 30 detects supply of the IrSS signal from the mobile phone 3 at t1, and then registers that information in the signal management table 161. In this case, since the signal t1 is the first signal, 1 and t1 are registered respectively in the "arrival order" and "arrival time" fields in association with the mobile phone 3 having an ID No. 1 (FIG. 6).

Subsequently, the signal selecting section 31 determines whether the signal t1 is a target signal or not, according to the rule 1 on the basis of the information stored in the signal management table 161. Specifically, since data processing has not been executed by the digital television set 1 (NO in S102), the signal selecting section 31 recognizes at t1 that the signal t1 is the first supplied signal. Therefore, the signal selecting section 31 determines that the signal t1 is a target signal for which data processing should be executed (the signal selecting section 31 may determine the signal t1 as a target signal on the basis of the registration of 1 in the "arrival order" field).

Then, the input signal managing section 30 stores the status information "now executing" indicating that data processing is now being executed in response to the signal t1 from the mobile phone 3 into the signal management table 161 in association with the mobile phone 3 (S103). The main control section 10 executes data processing according to the command from the signal t1 (S104). For example, the application executing section 34 launches the image display application 142 to start the processing for displaying the image contained in the image data 7 (heavy line extending from t1 to t6 in FIG. 7).

In this case, if, before the data processing is complete (NO in S105), the digital television set 1 receives another signal (YES in S107, e.g. at t4 in FIG. 7), the input signal managing section 30 registers a signal t4 in the signal management table 161. Specifically, 2 and t4 are registered respectively in the "arrival order" and "arrival time" fields in association with the HDD recorder 2.

In S102, the signal selecting section 31 determines whether or not the signal t4 is the target signal. In this example, the digital television set 1 has already been executing data processing in response to the signal t1. Therefore, the signal selecting section 31 recognizes that the signal t4 is not the first signal in the same signal group, and determines that the signal t4 is a non-target signal to be blocked according to the above rule 1 (YES in S102).

The signal blocking section 32 blocks the signal 4 so that the signal t4 is not processed by the digital television set 1 (S108). Specifically, examples of the signal blocking include: abandoning the signal t4 stored in the storage section 16; instructing the video image switching section 11 not to perform switching to input of a video signal derived from the signal t4; blocking supply of the signal t4 to the components (video signal converting section 22 and image display application 142) that process the signal t4; and prohibiting the components of interest from processing the signal t4.

When the signal blocking section 32 blocks the signal t4, the input signal managing section 30 sets the status information "blocking completed" in the signal management table 161 in association with the HDD recorder 2.

Then, when the data processing is complete (YES in S105, at t6 in FIG. 7), the input signal managing section 30 initializes the signal management table 161 so that the information "now executing" for the signal t1 is cancelled (S106).

The foregoing descriptions assume that the blocking period is "a period of time during which data processing is being executed in response to the target signal", i.e. "a period of time during which data reception processing is performed+a period of time during which processing for rendering a JPEG image in executable form and display thereof is performed". This is not the only possibility for the blocking period in a signal processing device of the present invention. For example, the blocking period may be only a period of time during which processing for IrSS signal reception is performed.

Further, the signal selecting section 31 may select the target signal on the basis of the type of signal. For example, according to a rule 2 that "an IrSS signal is regarded as a target signal", other kind of signal, such as a HDMI signal, in the same signal group as the IrSS signal may be determined as being a non-target signal. Besides, the period of time during which processing for the IrSS signal is performed can be regarded as the blocking period.

Alternatively, in a case where the operation-use image data 7' containing the processing designation information, rather than merely the image data 7, out of the IrSS signal has been received by the digital television set 1, a period of time during which the operation-use image data 7' is processed can be determined as the blocking period.

Further, in some cases, the processing designation information of the operation-use image data 7' designates the processing for accessing a particular URL. Such an operation-use image data 7' is image data of invitation to a particular web site, and is therefore referred to as IrSS invitation. Besides, a period of time during which the IrSS invitation is being received or processed may be determined as the blocking period. The period of time during which the IrSS invitation is being processed includes a data analysis time, a corresponding application launching time, and a meta-information processing time (In the case for a browser, a period of time during which a page at a designated URL is displayed).

[Configuration 2 of the Signal Processing Device]

In the aforementioned embodiment, the description has been presented on the configuration for blocking a signal supplied after the target signal in a period of time during which processing for the target signal is being executed. In the present embodiment, the following will further describe the configuration of a signal processing device that blocks a non-target signal for a predetermined time period even after the completion of the processing for the target signal.

Figure 9:
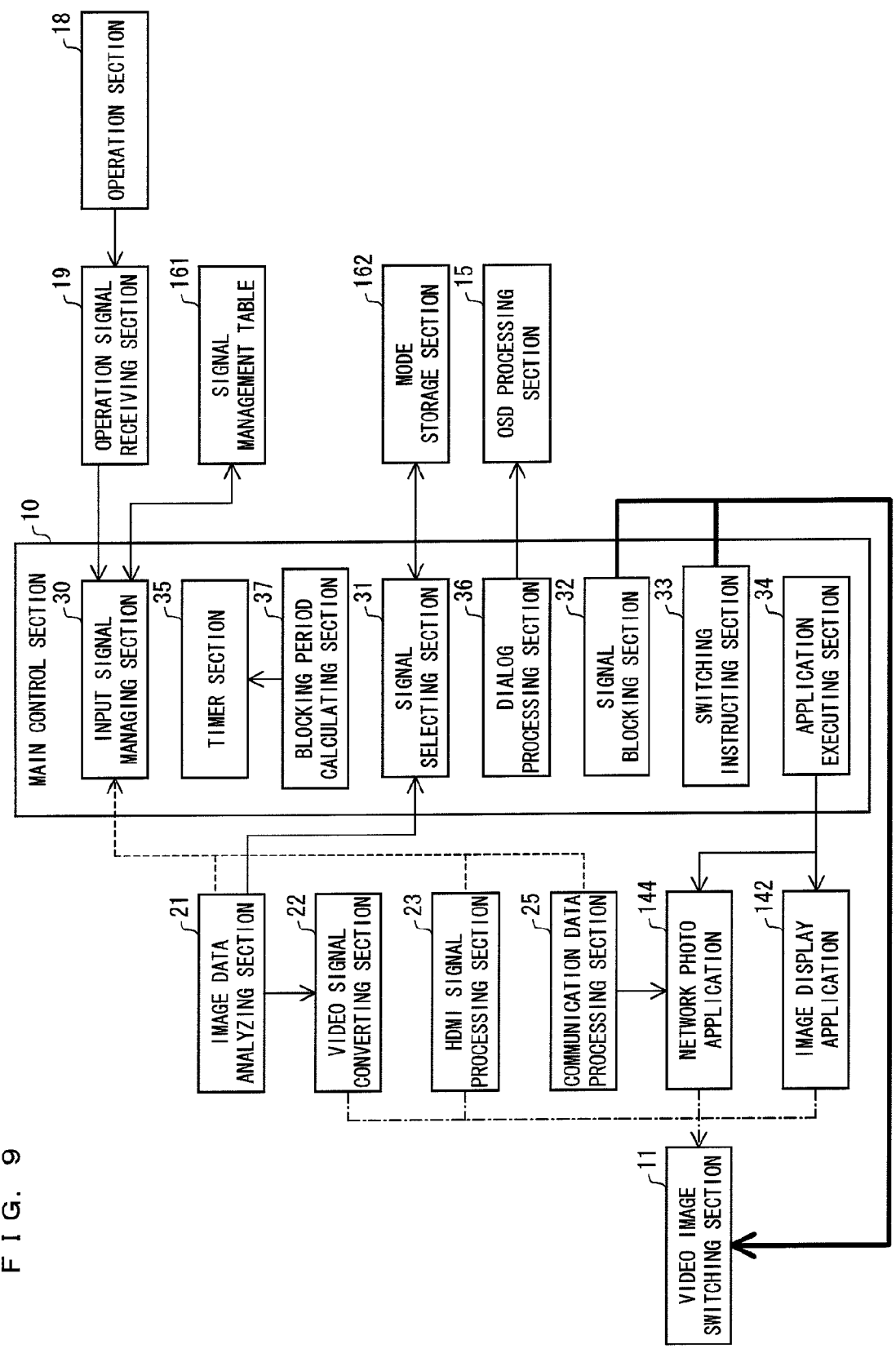
FIG. 9 is a block diagram showing essential components of a main control section of a digital television set in another embodiment of the present invention.

FIG. 9 is a block diagram showing essential components of the main control section 10 as a signal processing device of the present invention. As shown in FIG. 9, the main control section 10 may further include a timer section 35.

The timer section 35 measures a time period elapsed since a predetermined event has occurred. Specifically, the timer section 35 measures a predetermined time period elapsed since the processing for the target signal has been completed, or a predetermined time period elapsed since the first signal has arrived at the digital television set 1.

In the main control section 10, the components, particularly the signal selecting section 31 and the signal blocking section 32, perform signal processing (determination of the target signal and blocking of the non-target signal) within a predetermined time period measured by the timer section 35 since the predetermined event has occurred. The predetermined time period measured by the timer section 35 is referred to as a blocking period.

FIG. 10 is a view showing another specific example of the signal management table 161 referenced by the signal selecting section 31.

In the example shown in FIG. 10, the signal management table 161 stores the status information "now blocking" in association with the signal t1 from the mobile phone 3. This indicates that the signal t1 is determined as a target signal because the signal t1 is the first signal, and data processing is then executed (now being executed), or that data processing has been completed, but the blocking period measured by the timer section 35 does not expire. The input signal managing section 30 continues the setting of the information "now blocking" until the timer section 35 notifies the expiry of the blocking period. This information allows the signal selecting section 31 to recognize how long the incoming signals have to be blocked.

Variation Example 1

The main control section 10 of the present invention can be arranged so that after the non-target signal in the same signal group has been blocked, a signal in the second round from the same device as the non-target signal blocked last time is not blocked. This is based on an idea that with respect to the IrSS signal outputted from the mobile phone 3 through a single operation, only one signal is finally supplied from each device to the digital television set 1. That is, only one non-target signal in the same signal group as the target signal is supplied from each device, and it means that once the blocking has been performed, signal processing is properly performed. If a signal has been transmitted again from the same device as a source device of the already-blocked signal before the blocking period expires, it means that another operation has been newly performed by the mobile phone 3. That is, a signal in another signal group has been transmitted. If determining that a signal in another signal group has been transmitted, the input signal managing section 30 resets the signal management table 161 to manage such a new signal group. This allows the signal selecting section 31 to properly perform the determination of a target signal and a non-target signal in the new signal group.

[Signal Processing Flow 2]

Figure 11:
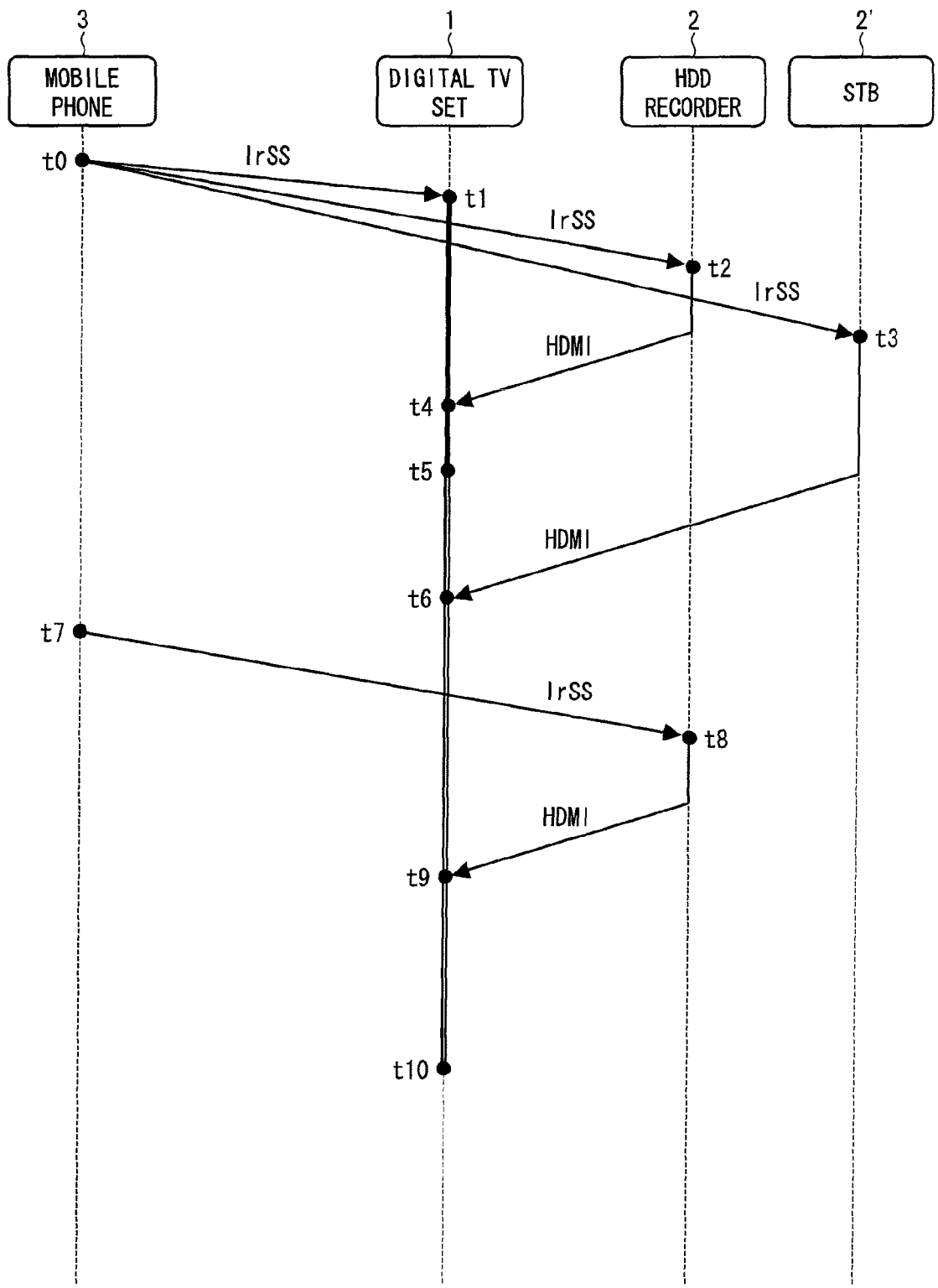
FIG. 11 is a sequence diagram showing timings of signal transmission/reception to/from a mobile phone, a digital television set, a HDD recorder, and an STB all of which constitute the photograph display system in another embodiment of the present invention.
Figure 12:
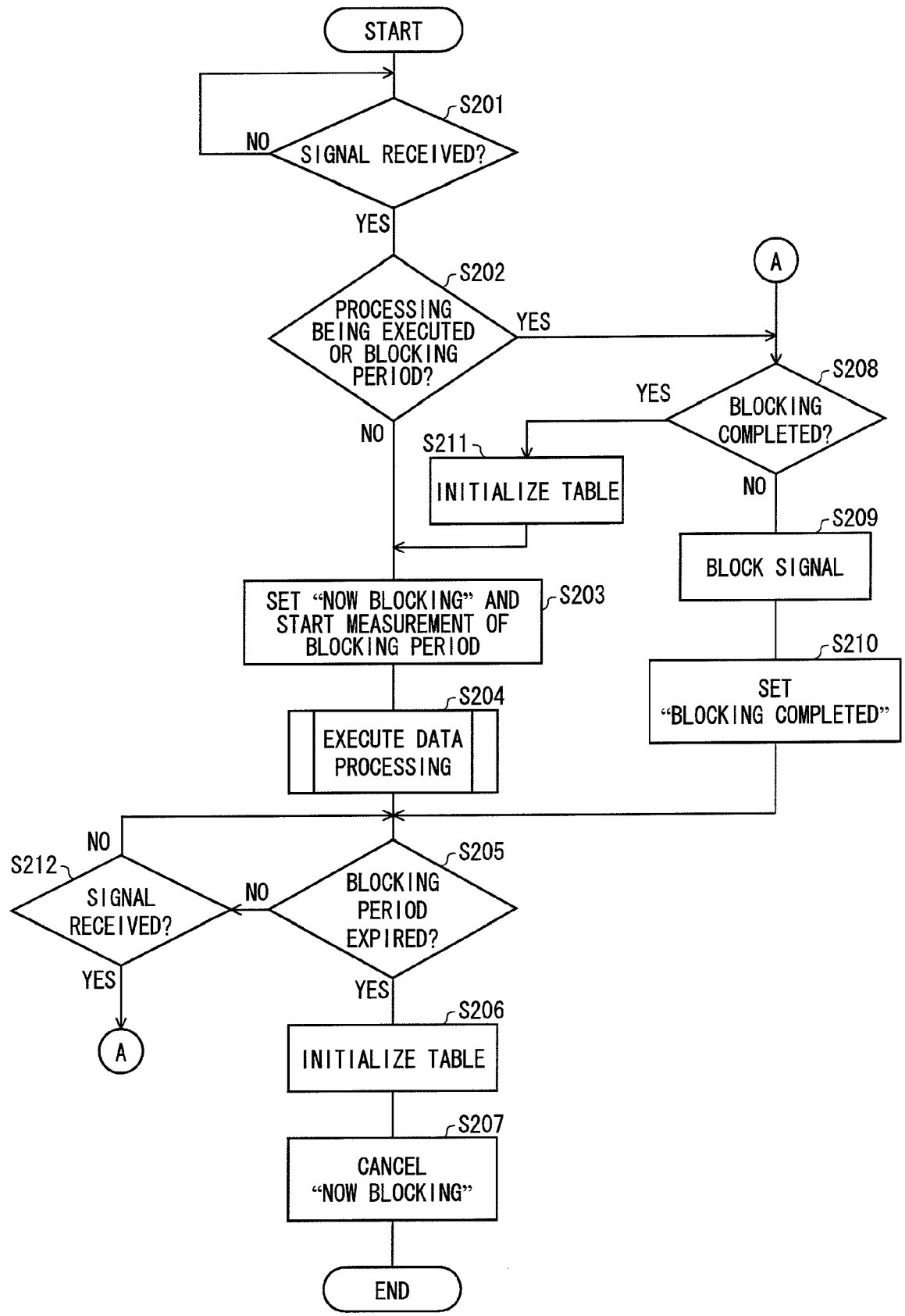
FIG. 12 is a flow chart showing a flow of processing performed by the digital television set in another embodiment of the present invention.

FIG. 11 is a sequence diagram showing timings of signal transmission/reception to/from the individual devices over a period of time between a time (t0) when a command signal is transmitted from the mobile phone 3 and a time (t5) when the execution of processing according to a target signal is completed and over a predetermined blocking period (t5 to t10) measured by the timer section. FIG. 12 is a flow chart showing a flow of processing performed by the digital television set 1 over the period of time between the time (t1) when the digital television set 1 receives a first command signal and the time (t10) when the blocking period expires after the time (t5) when processing is performed according to the target signal and completed.

In FIG. 11, a double line extending from t5 to t10 for the digital television set 1 indicates the blocking period that follows the completion of data processing.

When the mobile phone 3 transmits an IrSS signal (image data 7 or operation-use image data 7') to the digital television set 1 (t0 in FIG. 11), the infrared communication section 20 receives the IrSS signal at t1 as shown in FIG. 12 (YES in S201).

Subsequently, the input signal managing section 30 registers the received IrSS signal as a signal t1 in the signal management table 161. The signal selecting section 31 determines whether or not the registered t1 is a target signal. That is, the signal selecting section 31 determines whether the time t1 falls within a period of time during which data processing for a target signal in the same signal group is being executed, or the time t1 falls within the blocking period that follows the execution of the data processing. If the signal selecting section 31 determines, according to the signal management table 161 and the rule 1, that the time t1 falls within neither the period of time for the execution of the data processing nor the blocking period (NO in S202), the signal selecting section 31 determines that the signal t1 is a target signal because the signal t1 is the first signal.

At this time, processing for the signal t1 is executed, the input signal managing section 30 causes the status information "now blocking" indicating that the blocking period continues to respond to the signal t1 to be stored in the signal management table 161 in association with the mobile phone 3 (signal t1) (S203). Further, at this time, the timer section 35 starts measurement of a predetermined blocking period (t1 to t10 in FIG. 11). The main control section 10 (e.g. the application executing section 34) executes data processing according to the command from the signal t1 (S204, a heavy line extending from t1 to t5 in FIG. 11).

Before the expiry of the blocking period (No in S205), if the digital television set 1 receives another signal (YES in S212, e.g. at t6 in FIG. 11), the input signal managing section 30 registers the information of a signal t6 in the signal management table 161 in association with the STB 2'.

Note that if the status information of the STB 2' has already been "blocking completed" (YES in S208), the input signal managing section 30 determines that the signal t6 is a signal in the second round (in another signal group). According to the determination made by the input signal managing section 30, the signal selecting section 31 determines that the signal t6 is a target signal. The input signal managing section 30 initiates the signal management table 161 to re-register the signal t6 (S211). For the signal t6, the above-described step S203 and the following steps are performed.

On the other hand, if "blocking completed" is not set for the signal t6, i.e. if the input signal managing section 30 determines that the signal t6 from the STB 2' belongs to the same signal group as the signal t1 that is the target signal (NO in S208), the signal selecting section 31 determines that the signal t6 is not the first signal, and then determines according to the rule 1 that the signal t6 is a non-target signal.

According to the determination made by the signal selecting section 31, the signal blocking section 32 blocks the signal t6 to prevent the signal t6 from being processed in the digital television set 1 (S209). The input signal managing section 30 causes the sets the status information "blocking completed" for the signal t6 to be set in the signal management table 161 in association with the STB 2' (S210, FIG. 10).

Then, when the blocking period expires (YES in S205, at t10 in FIG. 11), the input signal managing section 30 initializes the signal management table 161 (S206) and then cancels the information "now blocking" for the signal t1 (S207).

According the above method, as shown in FIG. 11, even if a duration of time of processing for the target signal in the digital television set 1 is not long enough to block the non-target signal in the same signal group, it is possible to properly block not only a HDMI signal supplied at a time t4, but also the HDMI signal supplied at the time t6.

Further, even in a situation where a command given by another operation that has occurred at a time t7 is possibly blocked due to a sufficiently long blocking period, the input signal managing section 30 determines that a signal in the second round is a signal in a new signal group. This enables the signal selecting section 31 to make a proper determination for a signal that is not to be blocked.

[Configuration 3 of the Signal Processing Device]

In the aforementioned embodiment, the description has been presented on the configuration for determining a signal that has arrived first at the digital television set 1 in the first signal group as being a target signal. In the present embodiment, the following will describe the configuration for selecting a target signal according to information on a source device of a signal to which the digital television set 1 has responded last time (a last-time operation mode of the digital television set 1).

That is, the following will describe the configuration of a signal processing device that selects a target signal according to a rule 3 that "a signal supplied from a device to which the digital television set 1 has responded last time is regarded as a target signal.

As shown in FIG. 9, the storage section 16 includes a mode storage section 162. The mode storage section 162 stores information on a source device of a signal to which the digital television set 1 has responded last time (operation mode of the digital television set 1). Specifically, in a case where the digital television set 1 has executed some kind of data processing last time in response to an IrSS signal from the mobile phone 3, information "IrSS response mode" is stored as the last-time operation mode in the mode storage section 162. In a case where the digital television set 1 has responded to a HDMI signal from the HDD recorder 2, information "recorder output mode" is stored. In a case where the digital television set 1 has responded to a HDMI signal from the STB 2', information "STB output mode" is stored.

In the present embodiment, the signal selecting section 31 selects a target signal according to the last-time operation mode stored in the mode storage section 162, regardless of the order in which signals arrive. Specifically, from among signals in the same signal group received within a predetermined period of time (within the blocking period) measured by the timer section 35, the signal selecting section 31 selects, as a target signal, a signal supplied from a device that is the same as a device indicated by the last-time operation mode stored in the mode storage section 162.

If no signal has been received from a device that matches a device indicated by the last-time operation mode within the blocking period, the signal selecting section 31 determines, as the target signal, a signal that has arrived first among the incoming signals, and data processing is executed. The signal selecting section 31 updates the mode storage section 162 for the change to a mode corresponding to the source device of the target signal thus determined.

In the present embodiment, the timer section 35 starts time measurement at the point in time when the first signal is received, and continues the time measurement until a predetermined blocking period expires. The setting of a length of the blocking period should be made properly so that the length of the blocking period is not too short or too long. Otherwise, the following inconveniences may occur. If the set blocking period is too short, a signal to be blocked may be missed. Conversely, if the blocking period is too long, a signal not to be blocked may be blocked. Generally, the individual signals that belong to the same signal group are supplied to the digital television set 1 within a short period of time to some degree. Considering this, it is preferable that the blocking period is appropriately set in advance to be so short that no problem occurs when signals having been received within such a short blocking period are regarded as being in the signal group. For example, a fixed time parameter, such as 5 or 10 seconds after the reception of the first command, may be given to the timer section 35.

When the target signal has been determined before all the signals in the same signal group are received, the switching instructing section 33 transmits to the video image switching section 11 an instruction for switching to input of a video signal derived from the target signal according to the determination made by the signal selecting section 31.

(a) through (c) of FIG. 13 are views showing specific examples of the signal management table 161 at a certain point in time in the present embodiment.

For example, assume that the storage section 162 stores the "recorder output mode" as the last-time operation mode therein. In this case, even if an IrSS signal from the mobile phone 3, which belongs to the signal group, has arrived first at the digital television set 1, there is the possibility that a target signal may arrive at the digital television set 1 later. For this account, the signal selecting section 31 temporarily suspends the determination as to whether or not the IrSS signal is a target signal or a non-target signal. At this time, the input signal managing section 30 performs the setting of the status information "suspended" for the IrSS signal ((a) of FIG. 13).

Upon receipt of a HDMI signal from the HDD recorder 2, the signal selecting section 31 recognizes the incoming HDMI signal as a HDMI signal supplied from a device that matches the device indicated by the last-time operation mode stored in the mode storage section 162, and then determines that the HDMI signal is the target signal, and the IrSS signal is the non-target signal. The input signal managing section 30 updates the status information for the individual signals according to the determination result ((b) of FIG. 13). After having determined the target signal, the signal selecting section 31 can immediately determine that the subsequent signal in the same signal group as the target signal is a non-target signal ((c) of FIG. 13).

[Signal Processing Flow 3]

FIG. 14 is a sequence diagram showing timings of signal transmission/reception to/from the individual devices over a period of time between a time (t0) when a command signal is transmitted from the mobile phone 3 and a time (t7) when the blocking period of the digital television set 1 expires. FIG. 15 is a flow chart showing a flow of processing performed by the digital television set 1 over the period of time between the time (t1) when the digital television set 1 receives a first command signal and the time (t7) the blocking period expires.

When the mobile phone 3 transmits an IrSS signal to the infrared output range R (at t0 in FIG. 14), the infrared communication section 20 receives the IrSS signal at t1 (YES in S301), as shown in FIG. 15.

Subsequently, the input signal managing section 30 registers the incoming IrSS signal as a signal t1 in the signal management table 161, and also determines whether or not the signal t1 is the first signal according to whether or not any signal has been already registered in the signal management table 161.

If the signal t 1 is the first signal (signal arrival order=1) (YES in S302), the timer section 35 starts time measurement, and the signal selecting section 31 starts the operation to be performed during the blocking period (S303).

First, the signal selecting section 31 determines whether or not a source device of the signal t1 (in this case, mobile phone 3) matches a device indicated by the last-time operation mode stored in the mode storage section 162 (S304).

If there is no match between the devices, for example, if the "recorder output mode" is stored in the storage section 162 (NO in S304), the signal selecting section 31 determines, at S314, whether or not a target signal has been confirmed in the signal group to which the signal t1 belongs. That is, the signal selecting section 31 determines whether or not data processing is being executed or has been completed in response to the target signal. If the target signal has not been confirmed (No in S314), the signal selecting section 31 suspends the determination (S315, (a) of FIG. 13). If the blocking period measured by the timer section 35 has not expired (NO in S310), the main control section 10 returns to a state in which it waits for a subsequent signal (S313).

Now, as shown in FIG. 14, assume that the HDD recorder 2 has transmitted a HDMI signal to the digital television set 1 in response to the IrSS signal received at t2.

When the digital television set 1 receives the HDMI signal from the HDD recorder 2 at t4 (YES in S313), the input signal managing section 30 registers a signal t4 in the signal management table 161.

In S304, the signal selecting section 31 determines that the source device (HDD recorder 2) of the signal t4 matches the device indicated by the last-time operation mode in the mode storage section 162 (YES in S304), and determines that the signal t4 is the target signal according to the rule 3.

On the basis of the determination made by the signal selecting section 31, the input signal managing section 30 sets "now executing" as the status information associated with the HDD recorder 2 (signal t4) in the signal management table 161 (S305). The application executing section 34 executes data processing according to the target signal selected by the signal selecting section 31 (S306).

If it is confirmed according to the selection made by the signal selecting section 31 that the non-target signal which belongs to the same group as the above target signal (overlapping non-target signal) has already arrived, the signal blocking section 32 blocks such a non-target signal (S307). In this case, the signal t1 that has been "suspended" in S315 is blocked. Accordingly, the input signal managing section 30 updates the status information regarding the signal t1 from the "suspended" to "blocking completed" (S308, (b) in FIG. 13). If the application executing section 34 has completed the response to the signal t4, the input signal managing section 30 may update the status information regarding the signal t4 from "now executing" to "execution completed" (S309). If the blocking period measured by the timer section 35 has not expired yet (NO in S310), the main control section 10 returns to a state in which it waits for a subsequent signal (S313).

Here, as shown in FIG. 14, assume that the STB2' transmits the HDMI signal to the digital television set 1 in response to the IrSS signal having been received at t3.

When the digital television set 1 receives the HDMI signal from the STB2' at t5 (YES in S313), the input signal managing section 30 registers a signal t5 in the signal management table 161.

Since the source device of the signal t5 does not match the device indicated by the last-time operation mode (NO in S304), and the target signal has been already confirmed and data processing is being executed (YES in S314), the signal selecting section 31 determines that the signal t5 is a possible non-target signal to be blocked.

However, if the signal management table 161 indicates that the signal from the STB2' has been already blocked (YES in S317), the signal selecting section 31 determines the signal t5 as the target signal because the signal t5 is a signal in the second round, and updates the last-time operation mode in the mode storage section 162 (S316). Further, the input signal managing section 30 initializes the signal management table 161. Then, the above-described step S303 and the following steps are performed in the same manner.

On the other hand, if the signal from the STB2' is in the first round (NO in S317), the signal selecting section 31 determines that the signal t5 is a non-target signal.

According to the determination made by the signal selecting section 31, the signal blocking section 32 blocks the signal t5 (S318). The input signal managing section 30 sets "blocking completed" as the status information associated with the STB2' (signal t5) in the signal management table 161 (S319, (c) of FIG. 13).

If the blocking period measured by the timer section 35 has expired without reception of a signal (YES in S310, t7 in FIG. 14), the signal selecting section 31 references to the signal management table 161 to check whether or not any signal "suspended" is managed in the signal management table 161 (S311).

If there remains any signal "suspended" (YES in S311), it means that the target signal which is the same as the signal in the last-time operation mode among a series of signals in the same signal group has not been received within a predetermined period. That is, the signal being "suspended" which is different from the signal in the last-time operation mode is regarded as the target signal. The signal selecting section 31 selects, as the target signal, a signal first supplied to the digital television set 1 among signals being "suspended", and then updates the last-time operation mode in the mode storage section 162 to a new last-time operation mode corresponding to a source device of the selected signal (S316).

On the other hand, if there remains no signal "suspended" (NO in S311), the input signal managing section 30 determines that selection of the target signal and blocking of non-target signals have been made properly within the blocking period, and then initializes the signal management table 161 to terminate the processing.

According to the above-described method, even if overlapping signals are supplied from various devices to the digital television set 1, it is possible to properly determine a single target signal according to an operation mode used by the user last time on the digital television set 1 and to properly block remaining overlapping signals.

Consequently, it is possible to prevent the occurrence of a needless processing redundantly outputted from the digital television set 1 and to prevent a different processing result that is not intended by the user from being outputted from the digital television set 1.

[Configuration 4 of the Signal Processing Device]

In the aforementioned embodiment, the description has been presented on the configuration for selecting the target signal according to the last-time operation mode in the digital television set 1. In the present embodiment, the following will further describe the configuration in which in a case where meta-information regarding a target signal is attached to a signal that first arrives at the digital television set 1, the digital television set 1 selects the target signal according to the meta-information.

That is, the following will describe the configuration of a signal processing device that selects the target signal according to a rule 4 that "a signal from a device designated by the meta-information is regarded as the target signal".

In the present embodiment, a signal first supplied to the digital television set 1 among the signals in the same signal group is a directly received IrSS signal corresponding to the operation-use image data 7' transmitted from the mobile phone 3. Data structure of the operation-use image data 7' in the present embodiment is as follows. In the present embodiment, the meta-data region 711a of the operation-use image data 7' transmitted from the mobile phone 3 contains device designation information. The device designation information is information that designates a target device by which the operation-use image data 7' is to be processed.

The image data analyzing section 21 shown in FIG. 9 analyzes the operation-use image data 7' having been received from the mobile phone 3, and then extracts the device designation information from the operation-use image data 7' to transfer the extracted device designation information to the main control section 10. This allows the main control section 10 to properly process overlapping signals according to the device designation information.

As in the case with the aforementioned embodiment, the timer section 35 which is given a fixed timer parameter performs time measurement until a time represented by the time parameter elapses from the reception of a first command, and then notifies the blocking period to the components of the main control section 10.

The signal blocking section 32 blocks a signal that has been determined as a non-target signal, according to the determination made by the signal selecting section 31. The switching instructing section 33 transfers to switching instructing section 33 an instruction to perform switching to input of a video signal derived from the signal that has been determined as the target signal by the signal selecting section 31.

[Signal Processing Flow 4]

(a)~(c) of FIG. 16 are views showing specific examples of the signal management table 161 at a certain point in time in the present embodiment.

FIG. 17 is a flowchart showing a flow of processing performed by the digital television set 1 over the period of time between the time when the digital television set 1 receives an IrSS signal as a first command signal and the time when the blocking period expires.

When the mobile phone 3 transmits the IrSS signal (operation-use image data 7') to the infrared output range R (t0 in FIG. 14), the infrared communication section 20 receives the IrSS signal at t1, as shown in FIG. 17 (YES in S401 and S402).

Subsequently, the image data analyzing section 21 analyzes the operation-use image data 7' having been received by the infrared communication section 20, and extracts the device designation information from the meta-data region 711a (S403).

The input signal managing section 30 initializes the signal management table 161 (S404) and registers the incoming IrSS signal as a signal t1 in association with the mobile phone 3. At this moment, information regarding a target device may be registered device by device according to the device designation information analyzed by the image data analyzing section 21. For example, assume that the HDD recorder 2 is designated as the target device by the device designation information. In this case, the input signal managing section 30 sets a flag indicating the target device in a "target device" field for the HDD recorder 2 ((a) of FIG. 16). This determination is performed by the signal selecting section 31. Further, from this point in time, the timer section 35 starts time measurement, and the signal selecting section 31 starts the operation to be performed during the blocking period (S404).

The signal selecting section 31 compares the source device (mobile phone 3) of the signal t1 with the target device (HDD recorder 2) represented by the supplied device designation information. If there is no match, the signal selecting section 31 determines the signal t1 as a non-target signal (NO in S405).

If the signal t1 has not been blocked yet (NO in S412), the signal blocking section 32 blocks the signal t 1 according to the determination made by the signal selecting section 31 (S413). The input signal managing section 30 sets the status information in the signal management table 161 as "blocking completed" in association with the mobile phone 3 (signal t1) (S414). If the blocking period measured by the timer section 35 has not expired (NO in S409), the main control section 10 returns to a state in which it waits for a subsequent signal (S411). Note that as described previously, in S 412, if the received signal has already been blocked (YES in S412), the input signal managing section 30 determines the received signal as a signal not to be blocked in another signal group and then resets the signal management table 161 and the time measurement made by the timer section 35 (S415), so that the received signal is properly subjected to a new signal processing.

Next, as shown in FIG. 14, assume that the HDD recorder 2 has transmitted a HDMI signal to the digital television set 1 in response to the IrSS signal having been received at t2.

When the digital television set 1 has received the HDMI signal from the HDD recorder 2 at t4 (YES in S411), the input signal managing section 30 registers a signal t4 in the signal management table 161.

In S405, the signal selecting section 31 determines that the source device (HDD recorder 2) of the signal t4 matches the target device indicated by the device designation information (YES in S405), and the signal selecting section 31 determines the signal t4 as the target signal according to the rule 4.

According to the determination made by the signal selecting section 31, the input signal managing section sets "now executing" as the status information associated with the HDD recorder 2 (signal t4) in the signal management table 161 (S406, (b) of FIG. 16). The application executing section 34 executes data processing according to the target signal selected by the signal selecting section 31 (S407). If the application executing section 34 has completed the response to the signal t4, the input signal managing section 30 may update the status information regarding the signal t4 from "now executing" to "execution completed" (S408). If the blocking period measured by the timer section 35 has not expired yet (NO in S411), the main control section 10 returns to a state in which it waits for a subsequent signal (S411).

Then, when the blocking period measured by the timer section 35 has expired (YES in S409), the input signal managing section 30 determines that only a signal from the device indicated by the device designation information has been properly processed, and then initializes the table (S410). This completes the signal processing.

In the aforementioned embodiments, the arrangement has been described in which the digital television set 1 consolidates the overlapping signals in the same signal group, and determines the target signal according to the device designation information. However, this is not the only possibility. Alternatively, for example, the function of analyzing the device designation information (image data analyzing section 21) may be provided in an audio/visual device HDMI-connected to the digital television set 1. This makes it possible for each audio/visual device to determine whether it is a destination device for the incoming image data. If the audio/visual device determines that it is not the destination device, it does not perform processing on image data. Therefore, the audio/visual device does not transmit the HDMI signal 8 to the digital television set 1. According to the above arrangement, it is possible to realize the photograph display system 100 in which only a target signal is supplied to the digital television set 1.

However, as described in the aforementioned embodiments, it is preferable that the digital television set 1 consolidates signals in the same signal group to properly select a target signal. With the above arrangement, it is possible to establish the photograph display system 100 capable of properly processing only a target signal without addition of a new component to the conventional IrSS-compliant audio/visual devices connected to the digital television set 1, regardless of how many IrSS-compliant audio/visual devices are connected to the digital television set 1.

Variation Example 2

The aforementioned embodiments assume that a fixed value is predetermined for the blocking period measured by the timer section 35. However, this is not the only possibility. Alternatively, for example, the main control section 10 may have a blocking period calculating section 37 that calculates the blocking period.

The blocking period calculating section 37 may appropriately calculate the blocking period according to the amount of the image data 7 (operation-use image data 7') supplied to the digital television set 1, the performance of the digital television set 1 that processes that data, or a time required to process that data.

For example, the amount of data corresponding to an IrSS signal having been received via the infrared communication section 20 can be grasped by the blocking period calculating section 37, using the OBEX protocol. Assuming herein that the amount of data is xMB, and data processing capability of the digital television set 1 is 3.8 Mbps, the blocking period calculating section 37 can dynamically obtain a time required to perform data processing according to the amount of data, by the following equation: xMB×8 bit/3.8 Mbps (+decoding time). Throughout at least the obtained processing time, overlapping signals must be blocked. In view of this, the blocking period calculating section 37 can calculate the blocking period according to the amount of data so that the blocking period is more than the obtained time required to perform the processing on the data.

Alternatively, the blocking period calculating section 37 may calculate a longest processing time assumed as a result of considering the amount of data and the performance of the digital television set 1, and then perform the setting of the blocking period according the obtained longest processing time.

For example, assuming that the maximum amount of data that the digital television set 1 can receive based on the IrSS is 3.5 MB, the blocking time is found as follows:

$$3.5 \text{ MB} \times 8 \text{ bit}/3.8 \text{ Mbps} \approx 7.4 \text{ seconds}(+\text{decoding time}).$$

The blocking period calculating section 37 notifies to the timer section 35 that 7.4 seconds (+decoding time) has been calculated as the blocking period.

This makes it possible to overcome the disadvantage that the failure of signal blocking is caused by the expiry of the blocking period in a period of time during which the processing on a target signal is being executed.

Variation Example 3

Note that the rules followed by the signal selecting section 31 to select a target signal are not limited to the foregoing rules 1 through 4.

For example, the signal selecting section 31 may be arranged to always determine, as a target signal, an operation signal supplied to the digital television set 1 via the operation section 18 that is a remote controller, for the reason that the operation signal is a signal that most correctly reflects the user's intention. Upon receipt of the operation signal from the operation section 18 via the operation signal receiving section 19, the input signal managing section 30 stores information indicative of the operation signal from the operation section 18 in the signal management table 161. On the basis of the information, the signal selecting section 31 determines the operation signal as a target signal.

Alternatively, the operation-use image data 7' in which an objective designation information is stored in the meta-data region 711a may be transmitted to the digital television set 1. The objective designation information designates an objective to be achieved by the IrSS signal (operation-use image data 7').

The mobile phone 3 can designate an objective and add objective designation information to an image to be transmitted, before transmitting the operation-use image data 7' for the image to the digital television set 1. The objective is information indicating the user's desired result brought about by the transmission of the operation-use image data 7'. Examples of the objectives include: "objective 1: Web browsing" and "objective 2: photograph storage". For each of the objectives, a device that achieves the objective is predetermined, in the following manner, for example, "Web browsing is charged over by the digital television set 1" and "photograph storage is charged over by the HDD recorder 2". A table defining correspondences between these "objectives" and "devices" is stored in the storage section 16 so as to be referenced to by the signal selecting section 31. With this arrangement, when the objective designation information is extracted by the image data analyzing section 21, the signal selecting section 31 references to the above table stored in the storage section 16. This makes it possible to determine as to which device is a target device according to the user's objective, thus properly selecting a target signal. For example, assume that the objective designation information "objective 1: Web browsing" is added to an image received by the digital television set 1. In this case, "Web browsing is charged over by the digital television set 1". Therefore, the digital television set 1 having received the image is determined as the target device.

In another alternative arrangement, the signal selecting section 31 can be such that: in a case where an application related to IrSS reception is manually started by the user through the operation section 18 before reception of an IrSS signal, the signal selecting section regards that the user's intended result is the reception of an IrSS signal through the application of interest. The signal selecting section 31 determines the IrSS signal only as a target signal until such an application is closed by the user's operation.

Other possible arrangements are such that before transmission of the operation-use image data 7', a desired device to process the operation-use image data 7' is designated in advance on the mobile phone 3.

For example, an arrangement as shown in FIG. 18(a) may be adopted. In this arrangement, the user operates the mobile phone 3 and its menu screen (destination device list display) to select a desired destination device, before transmission of the operation-use image data 7'. Further, an arrangement as shown in FIG. 18(b) may be adopted. In this arrangement, a menu screen showing HDMI-connected devices is displayed on the display section 13 of the digital television set 1, so that the user easily designates a desired destination device by using the mobile phone 3, with the push of a button corresponding to a number that is assigned to the desired destination device. Alternatively, as shown in FIG. 18(c), the user can designate a preset device ID on the mobile phone 3 and then cause the mobile phone 3 to transmit the designated device ID to the digital television set 1. The digital television set 1 may determine a target device, i.e. a target signal from the device ID having been transmitted together with the operation-use image data 7'. Further, an arrangement as shown in FIG. 18(d) may be adopted. In this arrangement, from an on-screen list of devices connected to the digital television set 1, the user selects a desired device for the digital television set 1 in advance through the operation section 18. This allows the user to inform the desired device to the digital television set 1, without the user's intention being embedded in the operation-use image data 7'.

Alternatively, other possible arrangements are such that after transmission of the operation-use image data 7', the user selects a desired device to process the operation-use image data 7'.

For example, a dialog processing section 36 shown in FIG. 9 causes a dialog screen as shown in FIG. 19 or 20 to be outputted to the display section 13 through the OSD processing section 15. Specifically, at the blocking of overlapping signals, a dialog notifying the blocking of the overlapping signals to the user may be displayed (FIG. 19). Alternatively, other arrangement may be adopted (FIG. 20). In this arrangement, a grouping of signals respectively transmitted from the individual devices within a given period of time after reception of a first signal is regarded as one signal group, processing for the signals in the signal group are temporarily suspended, and the dialog processing section 36 then causes a dialog asking which signal is a target signal to be displayed.

This causes the user to designate a device from which a target signal has been supplied. With this arrangement, the input signal managing section 30 can know the user's designation through the OSD screen displayed by the dialog processing section 36 even though it is unclear which signal should be selected from among incoming signals in the same signal group. The dialog processing section 36 accepts the user's designation and then transfers it to the signal selecting section 31. This allows the signal selecting section 31 to properly process a target signal only.

Alternatively, received infrared signal strengths of incoming IrSS signals into the individual devices are detected, and then signals carrying the detection results are transmitted to the digital television set 1. The digital television set 1 consolidates information about the received signal strengths on the individual devices. Accordingly, the signal selecting section 31 may determine, as a target signal, a signal supplied from a device with the highest received signal strength among the signals in the same signal group. This is based on a premise that the user of the mobile phone 3 is presumed to perform image data transmission at a position closest to the desired device.

Variation Example 4

In the aforementioned embodiments, signals that have reached the digital television set 1 from the individual devices within a given period of time measured by the timer section 35 are grouped into one and the same signal group. However, this is not the only possibility for a manner of signal grouping.

For example, a possible arrangement is such that times when the individual devices (digital television set 1, HDD recorder 2, and STB2') have received IrSS signals from the mobile phone 3 (reception times, time stamps) are notified to the digital television set 1 in such a form that the reception times are contained in respective signals, so that the input signal managing section 30 manages the reception times for each device. If the reception times of the IrSS signals from the mobile phone 3 are equal to each other or close within a certain threshold range, the input signal managing section 30 may recognize that the corresponding signals having been received from the individual devices are the signals in the same signal group.

Another possible arrangement is such that the audio/visual devices each transmits to the digital television set 1 a signal along with a reason for the issuance of that signal. If there is a match between the reasons for the issuance of respective signals, the input signal managing section 30 can determine that the signals belong to the same signal group. For example, like "input switching for IrSS-based photograph reception", a command notification reason (e.g. command: input switching, reason: IrSS-based photograph reception) and/or a command type (switching to IrSS-based input, switching to input from the remote controller) are contained in a signal, and the signal is then supplied to the digital television set 1. The digital television set 1 manages the reason and command type for each incoming signal. The input signal managing section 30 can recognize that the signals having the same reason and command type belong to the same signal group.

Still another possible arrangement is such that the mobile phone 3 assigns, to image data (image data 7 or operation-use image data 7') to be transmitted, a command ID (which may be a sequential number or a time stamp) by which the image data is uniquely identified. Then, each of the audio/visual devices causes a signal (HDMI signal 8) to be outputted to the digital television set 1 to contain the command ID for the indication of which image data the HDMI signal is derived from. This makes it possible for the input signal managing section 30 to recognize the signals whose command IDs match each other as being in the same signal group.

Yet another possible arrangement is such that the digital television set 1 grasps, for each signal, a binary pattern for entire image data (photograph itself, music data, etc.) corresponding to an incoming IrSS signal to each device. With this arrangement, if there is a match between the signals in a binary level, the input signal managing section 30 can recognize them as being in the same signal group.

Further another possible arrangement is such that the audio/visual devices each transmits a signal along with a piece of location information to the digital television set 1. With reference to pieces of location information managed for respective signals, the input signal managing section 30 can recognize whether or not the signals belongs to the same signal group. Specifically, if the pieces of location information indicate a location within a certain area (e.g. HDMI-connected devices, devices connected to the same wall outlet, devices having the same settings of the location information (living room), etc.), their corresponding signals belong to the same signal group.

The aforementioned embodiments has discussed the case where the digital television set 1 selects one video signal from among a plurality of video signals that have been supplied to the video image switching section 11 due to the occurrence of redundant command signals. However, a signal processing device of the present invention may be arranged such that an audio output control section is controlled to properly select an audio signal from among audio signals that have been redundantly outputted to a speaker.

The present invention is not limited to the aforementioned embodiments and is susceptible of various changes within the scope of the accompanying claims. Also, an embodiment obtained by suitable combinations of technical means disclosed in the different embodiments are also included within the technical scope of the present invention.

Finally, each of the blocks in the main control section 10, particularly the input signal managing section 30, the signal selecting section 31, and the signal blocking section 32 may be constituted by hardware logic or realized by software by means of a CPU (central processing unit) as shown below.

That is, the main control section 10 includes a CPU that executes the order of a control program for realizing the aforesaid functions, ROM (read only memory) that stores the control program, RAM (random access memory) that develops the control program in executable form, and a storage device (storage medium), such as memory, that stores the control program and various types of data therein. The object of the present invention is realized by a predetermined storage medium. The storage medium stores, in computer-readable manner, program codes (executable code program, intermediate code program, and source program) of the control program of the main control section 10, which is software for realizing the aforesaid functions. The storage medium is provided to the main control section 10. With this arrangement, the main control section 10 (alternatively, CPU or MPU) as a computer reads out and executes program code stored in the storage medium provided.

The storage medium may be tape based, such as a magnetic tape or cassette tape; disc based, such as a magnetic disk including a Floppy® disc and hard disk and optical disk including CD-ROM, MO, MD, DVD, and CD-R; card based, such as an IC card (including a memory card) and an optical card; or a semiconductor memory, such as a mask ROM, EPROM, EEPROM, and a flash ROM.

Further, the main control section 10 may be arranged so as to be connectable to a communications network so that the program code is supplied to the main control section 10 through the communications network. The communications network is not to be particularly limited. Examples of the communications network include the Internet, intranet, extranet, LAN, ISDN, VAN, CATV communications network, virtual private network, telephone network, mobile communications network, and satellite communications network. Further, a transmission medium that constitutes the communications network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared light, Bluetooth®, 802.11, HDR, mobile phone network, satellite connections, and terrestrial digital network. Note that the present invention can be also realized by the program codes in the form of a computer data signal embedded in a carrier wave which is embodied by electronic transmission.

[Supplemental Remarks]

The electronic device of the present invention is preferable that such that the control section further comprises signal blocking means that blocks a command signal having not been selected by the signal selecting means in the signal group, so that the command signal having not been selected is not supplied to a command signal processing section that performs processing in response to the direct command signal or the indirect command signal.

According to the above arrangement, one command signal having been selected by the signal selecting means (i.e. the direct command signal or any of the indirect command signals all of which belong to the same signal group) is supplied to the command signal processing section. Therefore, even if the electronic device has redundantly received a plurality of signals, only an intended command signal that should be followed by the electronic device is properly selected and processed. Thus, it is possible to prevent needless processing from being redundantly performed in the electronic device.

The electronic device of the present invention is preferably such that the control section further comprises time measuring means that measures a time period elapsed since the first reception section or the second reception section has received any of the command signals, and that the signal blocking means blocks the command signal having not been selected by the signal selecting means, until the elapsed time period measured by the time measuring means reaches a predetermined time period.

According to the above arrangement, the time measuring means measures an elapsed time for a predetermined time period since either the direct command signal or the indirect command signal has arrived first at the electronic device. The signal blocking means blocks signals only for the predetermined time period measured by the time measuring means.

More specifically, a group of command signals supplied within a predetermined time period since the arrival of a first command signal at the electronic device, is regarded as being in the same signal group. Then, only one command signal selected in the signal group by the signal selecting means is processed, and the other command signals are blocked by the signal blocking means.

Since the direct command signal is transmitted only once from the remote control device, the indirect command signal deriving from the direct command signal is expected to arrive at the electronic device within some period of time, which is set as the predetermined time period. Therefore, it is possible to properly perform grouping of the command signals.

Thus, it is possible to accurately perform selection of the intended command signal and blocking of overlapping command signals.

The electronic device of the present invention is preferably such that the control section further comprises blocking period calculating means that calculates the predetermined time period to be measured by the time measuring means, according to an estimated amount of required time obtained in view of at least a processing capability of the electronic device and an amount of data corresponding to the direct command signal or the indirect command signal.

According to the above arrangement, it is possible to properly set the predetermined time period during which the signal blocking means is to lock the overlapping signals, according to an amount of time required for the execution of the intended command signal by the electronic device.

More specifically, it is possible to overcome the disadvantage that an interrupt is caused by supply of the overlapping command signal in a period of time during which the electronic device is processing the intended command signal, and the disadvantage that, even though having completed the processing of the intended command signal, the electronic device indefinitely regards command signals in a successive group as the overlapping signals and blocks them.

Therefore, it is possible to more properly perform selection of the intended command signal and blocking of the overlapping command signals with accuracy.

The electronic device of the present invention is preferably such that the control section further comprises input signal managing means that manages the reception of the direct command signal in association with the remote control device, which is a source device of the direct command signal, and manages the reception of the indirect command signal in association with each of the at least one controlled device, which is a source device of the indirect command signal, and the input signal managing means determines, as being in a same signal group, the command signals having been received within the predetermined time period measured by the time measuring means.

According to the above arrangement, it is possible for the electronic device to manage the command signals supplied within the predetermined time period measured by the time measuring means as being in the same signal group, and also to grasp which is a source device of each of the command signals among the devices constituting the remote control system.

This makes it possible to more correctly perform grouping, selection, and blocking of each of the command signals according to information regarding their source devices (the remote control device or any of the controlled devices).

The electronic device of the present invention is preferably such that in a case where two command signals whose source devices are identical have been received within the predetermined time period measured by the time measuring means, the input signal managing means determines that the latter command signal belongs to a signal group different from a signal group to which the former command signal belongs.

According to the above arrangement, in a case where two command signals have been supplied from the same device within the predetermined time period measured by the time measuring means, the input signal managing means determines that the latter command signal belongs to another signal group.

One transmission of the direct command signal from the remote control device causes one signal in the same group to be delivered to the electronic device from each of the devices constituting the remote control system. If one command signal has already been delivered from the same device within the measured time period, it means that the command signal delivered from such a device has been properly selected as the intended command signal in the signal group or blocked as the overlapping signal.

Therefore, a second signal delivered from the same device, even within the predetermined time period, is determined as being in another signal group, and then properly determined in the new signal group as to whether it is to be selected or blocked.

This makes it possible to more properly perform grouping, selection, and blocking of each of the command signals according to information regarding their source devices (the remote control device or any of the controlled devices) with accuracy.

The electronic device of the present invention may be arranged such that the indirect command signal contains a reception time that is a time when the controlled device which is the source device of the indirect command signal has received the direct command signal corresponding to the indirect command signal, and the input signal managing means: manages (i) a reception time that is a time when the first reception section has received the direct command signal and (ii) the reception time contained in the indirect command signal; and determines, if the reception times (i) and (ii) are close within a predetermined threshold range, that the command signals having been received at the reception times (i) and (ii) are in the same signal group.

According to the above arrangement, it is possible to determine, as being in the same signal group, the signals from the devices in the remote control system which have received almost at the same time the direct command signal that had been broadcasted by the remote control device.

The electronic device of the present invention may be arranged such that the predetermined rule is a rule that the command signal which has been received first by the electronic device is selected from among the command signals belonging to the same signal group, and according to the rule, the signal selecting means selects, as the intended command signal, the command signal having been received first by the electronic device.

In another alternative arrangement, the electronic device of the present invention may be such that the predetermined rule is a rule that a direct command signal from the remote control device is selected from a first signal group, and according to the rule, the signal selecting means selects, as the intended command signal, the direct command signal having been received from the remote control device.

In still another arrangement, the electronic device of the present invention may be such that the electronic device further comprises: a mode storage section that stores a last-time operation mode indicating which device is a source device of a command signal to which the electronic device has recently responded among the remote control device and the at least one controlled device, wherein the predetermined rule is a rule that the command signal from the device indicated by the last-time operation mode is selected from among the command signals belonging to the same signal group, and according to the rule, the signal selecting means selects, as the intended command signal, the command signal having been received from the device indicated by the last-time operation mode.

The electronic device of the present invention may be such that the direct command signal broadcasted by the remote control device contains device designation information indicating which device is a destination of the direct command signal among the electronic device and the at least one controlled device, the predetermined rule is a rule that the command signal from the device indicated by the device designation information is selected from among the command signals belonging to the same signal group, and according to the rule, the signal selecting means selects, as the intended command signal, the command signal having been received from the device indicated by the device designation information.

The electronic device of the present invention may be such that the direct command signal broadcasted by the remote control device contains objective designation information that designates an objective of the direct command signal, the predetermined rule is a rule that the command signal from the device capable of achieving the objective indicated by the objective designation information is selected from among the command signals belonging to the same signal group, and according to the rule, the signal selecting means selects, as the intended command signal, the command signal having been received from the device capable of achieving the objective indicated by the objective designation information.

The electronic device of the present invention may be such that the remote control system is provided with an operation section that outputs an operation signal(s) realizing operations of the electronic device and the controlled device, the electronic device further comprises a third reception section that receives the operation signal from the operation section, the predetermined rule is a rule that the operation signal is always selected as the intended command signal, and according to the rule, the signal selecting means selects, as the intended command signal, the operation signal having been received by the third reception section.

The electronic device of the present invention may be such that the remote control system is provided with an operation section that outputs an operation signal(s) realizing operation of the electronic device, the electronic device further comprises a third reception section that receives the operation signal from the operation section, the predetermined rule is a rule that in a case where the operation signal having been received by the third reception section is an instruction signal for launching an application related to reception of the direct command signal broadcasted by the remote control device, the direct command signal from the remote control device is selected from one signal group throughout a period of time during which the electronic device launches and runs the application according to the operation signal, and according to the rule, the signal selecting means selects, as the intended command signal, the direct command signal having been received from the remote control device, throughout a period of time during which the electronic device launches and runs the application.

The electronic device of the present invention may be such that the control section further comprises dialog processing means that generates a dialog for (a) asking a user who manipulates the remote control device about which device is a destination of the direct command signal having been transmitted from the remote control device among the electronic device and the at least one controlled device and (b) accepting a reply from the user, and the signal selecting means selects the intended command signal according to the user's reply having been accepted via the dialog processing means.

The electronic device of the present invention may be such that the signal blocking means blocks the command signal having not been selected by the signal selecting means, throughout a time period during which the command signal processing section is processing the intended command signal having been selected by the signal selecting means.

According to the above arrangement, the signal blocking means blocks the overlapping signal having not been selected throughout a time period during which the intended command signal is being processed.

This makes it possible to overcome the disadvantage that an interrupt is caused by supply of the overlapping command signal in a period of time during which the electronic device is processing the intended command signal.

The electronic device of the present invention may be such that the electronic device is a video display device that outputs a video signal to a display section, the control section further comprises: video signal generating means that generates the video signal according to any command signal from among the direct command signal and the at least one indirect command signal; and signal blocking means that blocks the command signal having not been selected by the signal selecting means in the signal group, so that the command signal having not been selected is not supplied to the video signal generating means.

According to the above arrangement, in the video display device that outputs a result in a manner visible for the user, one command signal is properly selected and processed even when a plurality of commands have been redundantly supplied to the video display device. In addition, the overlapping signal is properly blocked.

This makes it possible to overcome the disadvantages caused by passage through the controlled device, i.e. delay in display of a result on the video display device and repeated display of the same result. This increases user's convenience, thus producing particularly profound effects.

The electronic device of the present invention may be such that the direct command signal is image data containing: an image region that stores an image; and a metal-data region that stores processing designation information which is a command for causing the electronic device or the controlled device to execute a particular operation, the indirect command signal contains: a video signal for displaying the image on the display section; and a signal that requests the electronic device to perform switching to input of the video signal, and according to the selection made by the signal selecting means, the video signal generating means executes: (1) an operation of outputting, as a video signal, a result of processing executed according to the processing designation information contained in the direct command signal; or (2) an operation of outputting the video signal corresponding to the image according to the indirect command signal.

According to the above arrangement, it is possible, for the video display device on which a result is outputted in a manner visible for the user, to select one intended command signal desired by the user from among a plurality of incoming command signals that are overlapping command signals but different from each other in their resulting video signals for output, so as to display a proper processing result.

Besides, in the remote control system where different processing results can be outputted, a result desired by the user can be properly displayed. This produces particularly profound effects.

Note that the control section of the electronic device may be realized by a computer. In this case, (a) a signal processing control program causing the computer to operate as each means in a control section for the realization of the control section by means of a computer, and (b) a computer-readable recording medium storing the signal processing control program are also included in the scope of the present invention.

INDUSTRIAL APPLICABILITY

A signal processing device of the present invention can properly select a signal to be followed even when a controlled device redundantly receives a signal. The signal processing device of the present invention is therefore applicable to a remote control system where the controlled device can redundantly receive a plurality of signals with respect to one command from a remote controller. Particularly, a signal processing device of the present invention can be suitably used in a remote control system such that a remote control device, such as a remote controller, broadcasts IrSS or the like signals without designating a destination for one-way transmission of a command to a plurality of devices. Further, a signal processing device of the present invention can be suitably used in a controlled device having: a system of directly receiving a command from a remote control device, such as a remote controller; and a system of indirectly receiving a command from other connected device.

The invention claimed is:

1. An electronic device constituting a remote control system together with a remote control device and at least one controlled device that receives a direct command signal broadcasted by the remote control device, the electronic device comprising:
a first reception section that receives, from the remote control device, a direct command signal broadcasted to the electronic device and the at least one controlled device;
a second reception section that receives, from the at least one controlled device, an indirect command signal having been generated by the at least one controlled device according to the direct command signal having been received from the remote control device; and
a control section comprising signal selecting means that selects one intended command signal to which a response is needed from a signal group according to a predetermined rule, the signal group containing the direct command signal having been received by the first reception section and the at least one indirect command signal having been received by the second reception section, the control section further comprising:
signal blocking means that blocks a command signal having not been selected by the signal selecting means in the signal group, so that the command signal having not been selected is not supplied to a command signal processing section that performs processing in response to the direct command signal or the indirect command signal;
time measuring means that measures a time period elapsed since the first reception section or the second reception section has received any of the command signals; and
input signal managing means that manages the reception of the direct command signal in association with the remote control device, which is a source device of the direct command signal, and manages the reception of the indirect command signal in association with each of the at least one controlled device, which is a source device of the indirect command signal,
the input signal managing means determining, as being in a same signal group, the command signals having been received within the predetermined time period measured by the time measuring means,
the signal blocking means blocking the command signal having not been selected by the signal selecting means, until the elapsed time period measured by the time measuring means reaches a predetermined time period.

2. The electronic device according to claim 1, wherein
in a case where two command signals whose source devices are identical have been received within the predetermined time period measured by the time measuring means, the input signal managing means determines that the latter command signal belongs to a signal group different from a signal group to which the former command signal belongs.

3. The electronic device according to claim 2, wherein
the indirect command signal contains a reception time that is a time when the controlled device which is the source device of the indirect command signal has received the direct command signal corresponding to the indirect command signal, and
the input signal managing means: manages (i) a reception time that is a time when the first reception section has received the direct command signal and (ii) the reception time contained in the indirect command signal; and determines, if the reception times (i) and (ii) are close within a predetermined threshold range, that the command signals having been received at the reception times (i) and (ii) are in the same signal group.

4. The electronic device according to claim 1, wherein
the control section further comprises blocking period calculating means that calculates the predetermined time period to be measured by the time measuring means, according to an estimated amount of required time obtained in view of at least a processing capability of the electronic device and an amount of data corresponding to the direct command signal or the indirect command signal.

5. The electronic device according to claim 1, wherein
the remote control system is provided with an operation section that outputs an operation signal(s) realizing operations of the electronic device and the controlled device,
the electronic device further comprises a third reception section that receives the operation signal from the operation section,
the predetermined rule is a rule that the operation signal is always selected as the intended command signal, and
according to the rule, the signal selecting means selects, as the intended command signal, the operation signal having been received by the third reception section.

6. The electronic device according to claim 1, wherein
the control section further comprises dialog processing means that generates a dialog for (a) asking a user who manipulates the remote control device about which device is a destination of the direct command signal having been transmitted from the remote control device among the electronic device and the at least one controlled device and (b) accepting a reply from the user, and
the signal selecting means selects the intended command signal according to the user's reply having been accepted via the dialog processing means.

7. The electronic device according to claim 1, wherein
the electronic device is a video display device that outputs a video signal to a display section,
the control section further comprises:
video signal generating means that generates the video signal according to any command signal from among the direct command signal and the at least one indirect command signal; and
signal blocking means that blocks the command signal having not been selected by the signal selecting means in the signal group, so that the command signal having not been selected is not supplied to the video signal generating means.

8. The electronic device according to claim 7, wherein
the direct command signal is image data containing: an image region that stores an image; and a metal-data region that stores processing designation information which is a command for causing the electronic device or the controlled device to execute a particular operation,
the indirect command signal contains: a video signal for displaying the image on the display section; and a signal that requests the electronic device to perform switching to input of the video signal, and
according to the selection made by the signal selecting means, the video signal generating means executes:

(1) an operation of outputting, as a video signal, a result of processing executed according to the processing designation information contained in the direct command signal; or (2) an operation of outputting the video signal corresponding to the image according to the indirect command signal.

9. An electronic device constituting a remote control system together with a remote control device and at least one controlled device that receives a direct command signal broadcasted by the remote control device, the electronic device comprising:

a first reception section that receives, from the remote control device, a direct command signal broadcasted to the electronic device and the at least one controlled device;

a second reception section that receives, from the at least one controlled device, an indirect command signal having been generated by the at least one controlled device according to the direct command signal having been received from the remote control device;

a control section comprising signal selecting means that selects one intended command signal to which a response is needed from a signal group according to a predetermined rule, the signal group containing the direct command signal having been received by the first reception section and the at least one indirect command signal having been received by the second reception section; and a mode storage section that stores a last-time operation mode indicating which device is a source device of a command signal to which the electronic device has recently responded among the remote control device and the at least one controlled device, wherein the predetermined rule is a rule that the command signal from the device indicated by the last-time operation mode is selected from among the command signals belonging to the same signal group, and according to the rule, the signal selecting means selects, as the intended command signal, the command signal having been received from the device indicated by the last-time operation mode.

10. The electronic device according to claim 9, wherein the control section further comprises signal blocking means that blocks a command signal having not been selected by the signal selecting means in the signal group, so that the command signal having not been selected is not supplied to a command signal processing section that performs processing in response to the direct command signal or the indirect command signal.

11. The electronic device according to claim 10, wherein the signal blocking means blocks the command signal having not been selected by the signal selecting means, throughout a time period during which the command signal processing section is processing the intended command signal having been selected by the signal selecting means.

12. The electronic device according to claim 10, wherein the control section further comprises time measuring means that measures a time period elapsed since the first reception section or the second reception section has received any of the command signals, the signal blocking means blocks the command signal having not been selected by the signal selecting means, until the elapsed time period measured by the time measuring means reaches a predetermined time period, and the control section further comprises blocking period calculating means that calculates the predetermined time period to be measured by the time measuring means, according to an estimated amount of required time obtained in view of at least a processing capability of the electronic device and an amount of data corresponding to the direct command signal or the indirect command signal.

13. The electronic device according to claim 10, wherein the electronic device is a video display device that outputs a video signal to a display section, the control section further comprises:

video signal generating means that generates the video signal according to any command signal from among the direct command signal and the at least one indirect command signal; and signal blocking means that blocks the command signal having not been selected by the signal selecting means in the signal group, so that the command signal having not been selected is not supplied to the video signal generating means.

14. The electronic device according to claim 13, wherein the direct command signal is image data containing: an image region that stores an image; and a metal-data region that stores processing designation information which is a command for causing the electronic device or the controlled device to execute a particular operation, the indirect command signal contains: a video signal for displaying the image on the display section; and a signal that requests the electronic device to perform switching to input of the video signal, and according to the selection made by the signal selecting means, the video signal generating means executes:

(1) an operation of outputting, as a video signal, a result of processing executed according to the processing designation information contained in the direct command signal; or (2) an operation of outputting the video signal corresponding to the image according to the indirect command signal.

15. An electronic device constituting a remote control system together with a remote control device and at least one controlled device that receives a direct command signal broadcasted by the remote control device, the electronic device comprising:

a first reception section that receives, from the remote control device, a direct command signal broadcasted to the electronic device and the at least one controlled device;

a second reception section that receives, from the at least one controlled device, an indirect command signal having been generated by the at least one controlled device according to the direct command signal having been received from the remote control device; and a control section comprising signal selecting means that selects one intended command signal to which a response is needed from a signal group according to a predetermined rule, the signal group containing the direct command signal having been received by the first reception section and the at least one indirect command signal having been received by the second reception section, wherein the direct command signal broadcasted by the remote control device contains device designation information indicating which device is a destination of the direct command signal among the electronic device and the at least one controlled device, the predetermined rule is a rule that the command signal from the device indicated by the device designation information is selected from among the command signals belonging to the same signal group, and according to the rule, the signal selecting means selects, as the intended command signal, the command signal having been received from the device indicated by the device designation information, the control section further comprising:

signal blocking means that blocks a command signal having not been selected by the signal selecting means in the signal group, so that the command signal having not been selected is not supplied to a command signal processing section that performs processing in response to the direct command signal or the indirect command signal.

16. The electronic device according to claim 15, wherein the signal blocking means blocks the command signal having not been selected by the signal selecting means, throughout a time period during which the command signal processing section is processing the intended command signal having been selected by the signal selecting means.

17. The electronic device according to claim 15, wherein the control section further comprises time measuring means that measures a time period elapsed since the first reception section or the second reception section has received any of the command signals, the signal blocking means blocks the command signal having not been selected by the signal selecting means, until the elapsed time period measured by the time measuring means reaches a predetermined time period, and the control section further comprises blocking period calculating means that calculates the predetermined time period to be measured by the time measuring means, according to an estimated amount of required time obtained in view of at least a processing capability of the electronic device and an amount of data corresponding to the direct command signal or the indirect command signal.

18. The electronic device according to claim 15, wherein the electronic device is a video display device that outputs a video signal to a display section, the control section further comprises:

video signal generating means that generates the video signal according to any command signal from among the direct command signal and the at least one indirect command signal; and signal blocking means that blocks the command signal having not been selected by the signal selecting means in the signal group, so that the command signal having not been selected is not supplied to the video signal generating means.

19. The electronic device according to claim 18, wherein the direct command signal is image data containing: an image region that stores an image; and a metal-data region that stores processing designation information which is a command for causing the electronic device or the controlled device to execute a particular operation, the indirect command signal contains: a video signal for displaying the image on the display section; and a signal that requests the electronic device to perform switching to input of the video signal, and according to the selection made by the signal selecting means, the video signal generating means executes:

(1) an operation of outputting, as a video signal, a result of processing executed according to the processing designation information contained in the direct command signal; or (2) an operation of outputting the video signal corresponding to the image according to the indirect command signal.

20. An electronic device constituting a remote control system together with a remote control device and at least one controlled device that receives a direct command signal broadcasted by the remote control device, the electronic device comprising:

a first reception section that receives, from the remote control device, a direct command signal broadcasted to the electronic device and the at least one controlled device;

a second reception section that receives, from the at least one controlled device, an indirect command signal having been generated by the at least one controlled device according to the direct command signal having been received from the remote control device; and a control section comprising signal selecting means that selects one intended command signal to which a response is needed from a signal group according to a predetermined rule, the signal group containing the direct command signal having been received by the first reception section and the at least one indirect command signal having been received by the second reception section, wherein the direct command signal broadcasted by the remote control device contains objective designation information that designates an objective of the direct command signal, the predetermined rule is a rule that the command signal from the device capable of achieving the objective indicated by the objective designation information is selected from among the command signals belonging to the same signal group, and according to the rule, the signal selecting means selects, as the intended command signal, the command signal having been received from the device capable of achieving the objective indicated by the objective designation information, the control section further comprising:

signal blocking means that blocks a command signal having not been selected by the signal selecting means in the signal group, so that the command signal having not been selected is not supplied to a command signal processing section that performs processing in response to the direct command signal or the indirect command signal.

21. The electronic device according to claim 20, wherein the signal blocking means blocks the command signal having not been selected by the signal selecting means, throughout a time period during which the command signal processing section is processing the intended command signal having been selected by the signal selecting means.

22. The electronic device according to claim 20, wherein the control section further comprises time measuring means that measures a time period elapsed since the first reception section or the second reception section has received any of the command signals, the signal blocking means blocks the command signal having not been selected by the signal selecting means, until the elapsed time period measured by the time measuring means reaches a predetermined time period, and the control section further comprises blocking period calculating means that calculates the predetermined time period to be measured by the time measuring means, according to an estimated amount of required time obtained in view of at least a processing capability of the electronic device and an amount of data corresponding to the direct command signal or the indirect command signal.

23. The electronic device according to claim 20, wherein the electronic device is a video display device that outputs a video signal to a display section, the control section further comprises:

video signal generating means that generates the video signal according to any command signal from among the direct command signal and the at least one indirect command signal; and signal blocking means that blocks the command signal having not been selected by the signal selecting means in the signal group, so that the command signal having not been selected is not supplied to the video signal generating means.

24. The electronic device according to claim 23, wherein the direct command signal is image data containing: an image region that stores an image; and a metal-data region that stores processing designation information which is a command for causing the electronic device or the controlled device to execute a particular operation, the indirect command signal contains: a video signal for displaying the image on the display section; and a signal that requests the electronic device to perform switching to input of the video signal, and according to the selection made by the signal selecting means, the video signal generating means executes:

(1) an operation of outputting, as a video signal, a result of processing executed according to the processing designation information contained in the direct command signal; or (2) an operation of outputting the video signal corresponding to the image according to the indirect command signal.

25. An electronic device constituting a remote control system together with a remote control device and at least one controlled device that receives a direct command signal broadcasted by the remote control device, the remote control system being provided with an operation section that outputs an operation signal(s) realizing operation of the electronic device, the electronic device comprising:

a first reception section that receives, from the remote control device, a direct command signal broadcasted to the electronic device and the at least one controlled device;

a second reception section that receives, from the at least one controlled device, an indirect command signal having been generated by the at least one controlled device according to the direct command signal having been received from the remote control device;

a third reception section that receives the operation signal from the operation section; and a control section comprising signal selecting means that selects one intended command signal to which a response is needed from a signal group according to a predetermined rule, the signal group containing the direct command signal having been received by the first reception section and the at least one indirect command signal having been received by the second reception section, wherein the predetermined rule is a rule that in a case where the operation signal having been received by the third reception section is an instruction signal for launching an application related to reception of the direct command signal broadcasted by the remote control device, the direct command signal from the remote control device is selected from one signal group throughout a period of time during which the electronic device launches and runs the application according to the operation signal, and according to the rule, the signal selecting means selects, as the intended command signal, the direct command signal having been received from the remote control device, throughout a period of time during which the electronic device launches and runs the application.

26. The electronic device according to claim 25, wherein the control section further comprises signal blocking means that blocks a command signal having not been selected by the signal selecting means in the signal group, so that the command signal having not been selected is not supplied to a command signal processing section that performs processing in response to the direct command signal or the indirect command signal.

27. The electronic device according to claim 26, wherein the signal blocking means blocks the command signal having not been selected by the signal selecting means, throughout a time period during which the command signal processing section is processing the intended command signal having been selected by the signal selecting means.

28. The electronic device according to claim 26, wherein the control section further comprises time measuring means that measures a time period elapsed since the first reception section or the second reception section has received any of the command signals, the signal blocking means blocks the command signal having not been selected by the signal selecting means, until the elapsed time period measured by the time measuring means reaches a predetermined time period, and the control section further comprises blocking period calculating means that calculates the predetermined time period to be measured by the time measuring means, according to an estimated amount of required time obtained in view of at least a processing capability of the electronic device and an amount of data corresponding to the direct command signal or the indirect command signal.

29. The electronic device according to claim 26, wherein the electronic device is a video display device that outputs a video signal to a display section, the control section further comprises:

video signal generating means that generates the video signal according to any command signal from among the direct command signal and the at least one indirect command signal; and signal blocking means that blocks the command signal having not been selected by the signal selecting means in the signal group, so that the command signal having not been selected is not supplied to the video signal generating means.

30. The electronic device according to claim 29, wherein the direct command signal is image data containing: an image region that stores an image; and a metal-data region that stores processing designation information which is a command for causing the electronic device or the controlled device to execute a particular operation, the indirect command signal contains: a video signal for displaying the image on the display section; and a signal that requests the electronic device to perform switching to input of the video signal, and according to the selection made by the signal selecting means, the video signal generating means executes:

(1) an operation of outputting, as a video signal, a result of processing executed according to the processing designation information contained in the direct command signal; or (2) an operation of outputting the video signal corresponding to the image according to the indirect command signal.

31. A signal processing method for an electronic device constituting a remote control system together with a remote control device and at least one controlled device that receives a direct command signal broadcasted by the remote control device, the signal processing method comprising:

a direct command signal receiving step of receiving, from the remote control device, a direct command signal broadcasted to the electronic device and the at least one controlled device;

an indirect command signal receiving step of receiving, from the at least one controlled device, an indirect command signal having been generated by the at least one controlled device according to the direct command signal having been received from the remote control device;

a time measuring step of measuring a time period elapsed since the command signal has been received in the direct command signal receiving step or the indirect command signal receiving step;

an input signal managing step of managing the reception of the direct command signal in association with the remote control device, which is a source device of the direct command signal, and manages the reception of the indirect command signal in association with each of the at least one controlled device, which is a source device of the indirect command signal;

a signal selecting step of selecting one intended command signal to which a response is needed from a signal group according to a predetermined rule, the signal group containing the direct command signal having been received in the direct command signal receiving step and the at least one indirect command signal having been received in the indirect command signal receiving step; and a signal blocking step of blocking a command signal having not been selected in the signal group in the signal selecting step, so that the command signal having not been selected is not supplied to a command signal processing section that performs processing in response to the direct command signal or the indirect command signal, wherein in the input signal managing step, the command signals having been received within the predetermined time period measured in the time measuring step are determined as being in a same signal group, and in the a signal blocking step, the command signal having not been selected in the signal selecting step is blocked until the elapsed time period measured in the time measuring step reaches a predetermined time period.

32. A non-transitory computer-readable recording medium recording a signal processing control program that operates an electronic device constituting a remote control system together with a remote control device and at least one controlled device that receives a direct command signal broadcasted by the remote control device, the signal processing control program causing a computer to execute:

a direct command signal receiving step of receiving, from the remote control device, a direct command signal broadcasted to the electronic device and the at least one controlled device;

an indirect command signal receiving step of receiving, from the at least one controlled device, an indirect command signal having been generated by the at least one controlled device according to the direct command signal having been received from the remote control device;

a time measuring step of measuring a time period elapsed since the command signal has been received in the direct command signal receiving step or the indirect command signal receiving step;

an input signal managing step of managing the reception of the direct command signal in association with the remote control device, which is a source device of the direct command signal, and manages the reception of the indirect command signal in association with each of the at least one controlled device, which is a source device of the indirect command signal;

a signal selecting step of selecting one intended command signal to which a response is needed from a signal group according to a predetermined rule, the signal group containing the direct command signal having been received in the direct command signal receiving step and the at least one indirect command signal having been received in the indirect command signal receiving step; and a signal blocking step of blocking a command signal having not been selected in the signal group in the signal selecting step, so that the command signal having not been selected is not supplied to a command signal processing section that performs processing in response to the direct command signal or the indirect command signal, wherein in the input signal managing step, the command signals having been received within the predetermined time period measured in the time measuring step are determined as being in a same signal group, and in the a signal blocking step, the command signal having not been selected in the signal selecting step is blocked until the elapsed time period measured in the time measuring step reaches a predetermined time period.

* * * * *